United States Patent
Duesel, Jr. et al.

(10) Patent No.: US 9,943,774 B2
(45) Date of Patent: *Apr. 17, 2018

(54) FLUID EVAPORATOR FOR AN OPEN FLUID RESERVOIR

(71) Applicant: HEARTLAND TECHNOLOGY PARTNERS LLC, St Louis, MO (US)

(72) Inventors: Bernard F. Duesel, Jr., Goshen, NY (US); Craig Clerkin, Stoughton, WI (US); Michael J. Rutsch, Pittsburgh, PA (US)

(73) Assignee: HEARTLAND TECHNOLOGY PARTNERS LLC, St. Louis, MO (US)

( * ) Notice: Subject to any disclaimer, the term of this patent is extended or adjusted under 35 U.S.C. 154(b) by 640 days.

This patent is subject to a terminal disclaimer.

(21) Appl. No.: 14/325,796

(22) Filed: Jul. 8, 2014

(65) Prior Publication Data

US 2014/0311684 A1  Oct. 23, 2014

Related U.S. Application Data

(62) Division of application No. 13/849,274, filed on Mar. 22, 2013, now Pat. No. 8,808,497.

(Continued)

(51) Int. Cl.
*B01D 1/14* (2006.01)
*B01D 1/00* (2006.01)
(Continued)

(52) U.S. Cl.
CPC .............. *B01D 1/0005* (2013.01); *B01D 1/14* (2013.01); *B01D 1/30* (2013.01); *C02F 1/043* (2013.01); *C02F 1/10* (2013.01); *Y02W 10/37* (2015.05)

(58) Field of Classification Search
CPC .......... B01D 1/0005; B01D 1/14; B01D 1/30; C02F 1/043; C02F 1/10
See application file for complete search history.

(56) References Cited

U.S. PATENT DOCUMENTS

| | | | |
|---|---|---|---|
| 2,372,846 | A | 4/1945 | Frederick et al. |
| 2,387,818 | A | 10/1945 | Wethly |

(Continued)

FOREIGN PATENT DOCUMENTS

| | | |
|---|---|---|
| CL | 757-2004 | 5/2007 |
| DE | 556 455 C | 8/1932 |

(Continued)

OTHER PUBLICATIONS

"Gas Atomized Venturi Scrubbers," Bionomic Industries, copyright 2008, printed from www.bionomicind.com <http://www.bionomicind.com> on May 25, 2011.

(Continued)

*Primary Examiner* — Jonathan Miller
(74) *Attorney, Agent, or Firm* — Marshall, Gerstein & Borun LLP

(57) ABSTRACT

A reservoir evaporation system for evaporating fluid from an open reservoir of effluent containing a contaminant includes a fluid evaporator, an air pump, and an air supply conduit functionally connecting the fluid evaporator with the air pump. The fluid evaporator includes a vessel adapted to be positioned in an operative position partially submerged on the top surface of the effluent in the reservoir with a lower chamber submerged in the effluent and an upper chamber extending above the top surface of the effluent. In operation, air from the air pump mixes with the effluent inside the fluid evaporator and subsequently is discharged through exhaust openings. A fluid discharge pipe can also simultaneously discharge aerated effluent back down into the reservoir. Fluid is thereby separated from the effluent in the lower (Continued)

chamber by evaporation in a controlled manner that minimizes spread of contaminants to surrounding environments by wind.

23 Claims, 5 Drawing Sheets

Related U.S. Application Data

(60) Provisional application No. 61/614,601, filed on Mar. 23, 2012.

(51) Int. Cl.

| | |
|---|---|
| *B01D 1/30* | (2006.01) |
| *C02F 1/04* | (2006.01) |
| *C02F 1/10* | (2006.01) |

(56) References Cited

U.S. PATENT DOCUMENTS 2,468,455 A 4/1949 Metziger
2,560,226 A 7/1951 Joos et al.
2,619,421 A 11/1952 Greenfield
2,651,647 A 9/1953 Greenfield
2,658,349 A 11/1953 Keller
2,658,735 A 11/1953 Ybarrondo
2,721,065 A 10/1955 Ingram
2,790,506 A 4/1957 Vactor
2,867,972 A 1/1959 Hokderreed et al.
2,879,838 A 3/1959 Flynt et al.
2,890,166 A 6/1959 Heinze
2,911,421 A 11/1959 Greenfield
2,911,423 A 11/1959 Greenfield
2,979,408 A 4/1961 Greenfield
2,981,250 A 4/1961 Steward
3,060,921 A 10/1962 Luring et al.
3,076,715 A 2/1963 Greenfield
3,203,875 A 8/1965 Harris
3,211,538 A 10/1965 Gross et al.
3,212,235 A 10/1965 Markant
3,251,398 A 5/1966 Greenfield
3,268,443 A 8/1966 Cann
3,284,064 A 11/1966 Kolm et al.
3,299,651 A 1/1967 McGrath
3,304,991 A 2/1967 Greenfield
3,306,039 A 2/1967 Peterson
3,323,575 A 6/1967 Greenfield
3,405,918 A 10/1968 Calaceto et al.
3,432,399 A 3/1969 Schutt
3,539,549 A 11/1970 Greenfield
3,578,892 A 5/1971 Wilkinson
3,601,374 A 8/1971 Wheeler
3,638,924 A 2/1972 Calaceto et al.
3,704,570 A 12/1972 Gardenier
3,713,786 A 1/1973 Umstead
3,716,458 A 2/1973 Greenfield et al.
3,730,673 A 5/1973 Straitz, III
3,743,483 A 7/1973 Shah
3,754,869 A 8/1973 Van Raden
3,756,580 A 9/1973 Dunn
3,756,893 A 9/1973 Smith
3,762,893 A 10/1973 Larsen
3,782,300 A 1/1974 White et al.
3,789,902 A 2/1974 Shah et al.
3,826,096 A 7/1974 Hrusch
3,838,974 A 10/1974 Hemsath et al.
3,838,975 A 10/1974 Tabak
3,840,002 A 10/1974 Douglas et al.
3,855,079 A 12/1974 Greenfield et al.
3,870,585 A 3/1975 Kearns et al.
3,876,490 A 4/1975 Tsuruta
3,880,756 A 4/1975 Raineri et al.
3,898,134 A 8/1975 Greenfield et al.
3,901,643 A 8/1975 Reed et al.
3,915,620 A 10/1975 Reed
3,917,508 A 11/1975 Greenfield et al.
3,925,148 A 12/1975 Erwin
3,944,215 A 3/1976 Beck
3,945,331 A 3/1976 Drake et al.
3,947,215 A 3/1976 Peterson et al.
3,947,327 A 3/1976 Greenfield et al.
3,950,230 A 4/1976 Greenfield et al.
3,994,671 A 11/1976 Straitz, III
4,001,077 A 1/1977 Kemper
4,007,094 A 2/1977 Greenfield et al.
4,012,191 A 3/1977 Lisankie et al.
4,013,516 A 3/1977 Greenfield et al.
4,026,682 A 5/1977 Pausch
4,036,576 A 7/1977 McCracken
4,070,423 A 1/1978 Pierce
4,079,585 A 3/1978 Helleur
4,080,883 A 3/1978 Zink et al.
4,092,908 A 6/1978 Straitz, III
4,118,173 A 10/1978 Shakiba
4,119,538 A 10/1978 Yamauchi et al.
4,140,471 A 2/1979 Straitz, III et al.
4,154,570 A 5/1979 Schwartz
4,157,239 A 6/1979 Reed
4,181,173 A 1/1980 Pringle
4,185,685 A 1/1980 Giberson
4,198,198 A 4/1980 Straitz, III
4,227,897 A 10/1980 Reed
4,230,536 A 10/1980 Sech
4,257,746 A 3/1981 Wells
4,259,185 A 3/1981 Mixon
4,264,826 A 4/1981 Ullmann
4,270,974 A 6/1981 Greenfield et al.
4,276,115 A 6/1981 Greenfield et al.
4,285,578 A 8/1981 Yamashita et al.
4,300,924 A 11/1981 Coyle
4,306,858 A 12/1981 Simon
4,336,101 A 6/1982 Greenfield et al.
4,346,660 A 8/1982 McGill
RE31,185 E 3/1983 Greenfield et al.
4,430,046 A 2/1984 Cirrito
4,432,914 A 2/1984 Schifftner
4,440,098 A 4/1984 Adams
4,445,464 A 5/1984 Gerstmann et al.
4,445,842 A 5/1984 Syska
4,450,901 A 5/1984 Janssen
4,485,746 A 12/1984 Erlandsson
4,496,314 A 1/1985 Clarke
4,518,458 A 5/1985 Greenfield et al.
4,538,982 A 9/1985 McGill et al.
4,583,936 A 4/1986 Krieger
4,608,120 A 8/1986 Greenfield et al.
4,613,409 A 9/1986 Volland
4,648,973 A 3/1987 Hultholm et al.
4,652,233 A 3/1987 Hamazaki et al.
4,658,736 A 4/1987 Walter
4,683,062 A 7/1987 Krovak et al.
4,689,156 A 8/1987 Zibrida
4,693,304 A 9/1987 Volland
4,771,708 A 9/1988 Douglass, Jr.
4,863,644 A 9/1989 Harrington et al.
4,882,009 A 11/1989 Santoleri et al.
4,890,672 A 1/1990 Hall
4,909,730 A 3/1990 Roussakis et al.
4,913,065 A 4/1990 Hemsath
4,938,899 A 7/1990 Oros et al.
4,952,137 A 8/1990 Schwartz et al.
4,961,703 A 10/1990 Morgan
5,009,511 A 4/1991 Sarko et al.
5,028,298 A 7/1991 Baba et al.
5,030,428 A 7/1991 Dorr et al.
5,032,230 A 7/1991 Shepherd
5,068,092 A 11/1991 Aschauer
5,076,895 A 12/1991 Greenfield et al.
5,132,090 A 7/1992 Volland
5,154,898 A 10/1992 Ajinkya et al.
5,176,798 A 1/1993 Rodden
5,183,563 A 2/1993 Rodden
5,227,017 A 7/1993 Tanaka et al.

(56) References Cited

U.S. PATENT DOCUMENTS

| | | |
|---|---|---|
| 5,238,580 A | 8/1993 | Singhvi |
| 5,279,356 A | 1/1994 | Bruhn |
| 5,279,646 A | 1/1994 | Schwab |
| 5,336,284 A | 8/1994 | Schifftner |
| 5,342,482 A | 8/1994 | Duesel, Jr. |
| D350,838 S | 9/1994 | Johnson |
| 5,347,958 A | 9/1994 | Gordon, Jr. |
| 5,423,979 A | 6/1995 | Allen |
| 5,460,511 A | 10/1995 | Grahn |
| 5,484,471 A | 1/1996 | Schwab |
| 5,512,085 A | 4/1996 | Schwab |
| 5,527,984 A | 6/1996 | Stultz et al. |
| 5,585,005 A | 12/1996 | Smith et al. |
| 5,630,913 A | 5/1997 | Tajer-Ardebili |
| 5,632,864 A | 5/1997 | Enneper |
| 5,636,623 A | 6/1997 | Panz et al. |
| 5,648,048 A | 7/1997 | Kuroda et al. |
| 5,656,155 A | 8/1997 | Norcross et al. |
| 5,662,802 A | 9/1997 | Heins et al. |
| 5,695,614 A | 12/1997 | Hording et al. |
| 5,695,643 A | 12/1997 | Brandt et al. |
| 5,735,680 A | 4/1998 | Henkelmann |
| 5,749,719 A | 5/1998 | Rajewski |
| 5,759,233 A | 6/1998 | Schwab |
| 5,810,578 A | 9/1998 | Hystad et al. |
| 5,865,618 A | 2/1999 | Hiebert |
| 5,879,563 A | 3/1999 | Garbutt |
| 5,925,223 A | 7/1999 | Simpson et al. |
| 5,934,207 A | 8/1999 | Echols et al. |
| 5,951,743 A | 9/1999 | Hsieh et al. |
| 5,958,110 A | 9/1999 | Harris et al. |
| 5,968,320 A | 10/1999 | Sprague |
| 5,968,352 A | 10/1999 | Ditzler |
| 6,007,055 A | 12/1999 | Schifftner |
| 6,119,458 A | 9/2000 | Harris et al. |
| 6,149,137 A | 11/2000 | Johnson et al. |
| 6,250,916 B1 | 6/2001 | Philippe et al. |
| 6,276,872 B1 | 8/2001 | Schmitt |
| 6,293,277 B1 | 9/2001 | Panz et al. |
| 6,332,949 B1 | 12/2001 | Beckhaus et al. |
| 6,345,495 B1 | 2/2002 | Cummings |
| 6,383,260 B1 | 5/2002 | Schwab |
| 6,391,100 B1 | 5/2002 | Hogan |
| 6,391,149 B1 | 5/2002 | Calfee et al. |
| 6,394,428 B2 * | 5/2002 | Hinada .............. B01D 53/1475 261/120 |
| 6,402,816 B1 | 6/2002 | Trivett et al. |
| 6,435,860 B1 | 8/2002 | Brookshire et al. |
| 6,468,389 B1 | 10/2002 | Harris et al. |
| 6,485,548 B1 | 11/2002 | Hogan |
| 6,500,216 B1 | 12/2002 | Takayasu |
| 6,616,733 B1 | 9/2003 | Pellegrin |
| 6,632,083 B1 | 10/2003 | Bussman et al. |
| 6,719,829 B1 | 4/2004 | Schwab |
| 6,733,636 B1 | 5/2004 | Heins |
| 6,742,337 B1 | 6/2004 | Hays et al. |
| 6,752,920 B2 | 6/2004 | Harris et al. |
| 6,913,671 B2 * | 7/2005 | Bolton .................... B01D 1/30 159/16.2 |
| 6,919,000 B2 | 7/2005 | Klausner et al. |
| 6,926,757 B2 | 8/2005 | Kalliokoski et al. |
| 6,936,140 B2 | 8/2005 | Paxton et al. |
| 7,037,434 B2 | 5/2006 | Myers et al. |
| 7,069,991 B2 | 7/2006 | Gudmestad et al. |
| 7,073,337 B2 | 7/2006 | Mangin |
| 7,074,339 B1 | 7/2006 | Mims |
| 7,077,201 B2 | 7/2006 | Heins |
| 7,111,673 B2 | 9/2006 | Hugill |
| 7,142,298 B2 | 11/2006 | Nuspliger |
| 7,144,555 B1 | 12/2006 | Squires et al. |
| 7,150,320 B2 | 12/2006 | Heins |
| 7,156,985 B1 | 1/2007 | Frisch |
| 7,166,188 B2 | 1/2007 | Kedem et al. |
| 7,225,620 B2 | 6/2007 | Klausner et al. |
| 7,288,186 B2 | 10/2007 | Harris |
| 7,332,010 B2 | 2/2008 | Steiner |
| 7,402,247 B2 | 7/2008 | Sutton |
| 7,416,172 B2 | 8/2008 | Duesel, Jr. et al. |
| 7,416,177 B2 | 8/2008 | Suzuki et al. |
| 7,424,999 B2 | 9/2008 | Xu et al. |
| 7,428,926 B2 | 9/2008 | Heins |
| 7,438,129 B2 | 10/2008 | Heins |
| 7,442,035 B2 | 10/2008 | Duesel, Jr. et al. |
| 7,459,135 B2 | 12/2008 | Pieterse et al. |
| 7,572,626 B2 | 8/2009 | Frisch et al. |
| 7,591,309 B2 | 9/2009 | Minnich et al. |
| 7,614,367 B1 | 11/2009 | Frick |
| 7,661,662 B2 | 2/2010 | Forstmanis |
| 7,681,643 B2 | 3/2010 | Heins |
| 7,717,174 B2 | 5/2010 | Heins |
| 7,758,819 B2 | 7/2010 | Nagelhout |
| 7,832,714 B2 | 11/2010 | Duesel, Jr. et al. |
| 7,955,419 B2 | 6/2011 | Casella |
| 8,066,845 B2 | 11/2011 | Duesel, Jr. et al. |
| 8,114,287 B2 | 2/2012 | Harris |
| 8,136,797 B2 | 3/2012 | Duesel, Jr. et al. |
| 2001/0013666 A1 | 8/2001 | Nomura et al. |
| 2002/0069838 A1 | 6/2002 | Rautenbach et al. |
| 2003/0104778 A1 | 6/2003 | Liu |
| 2003/0127226 A1 | 7/2003 | Heins |
| 2004/0000515 A1 | 1/2004 | Harris et al. |
| 2004/0031424 A1 | 2/2004 | Pope |
| 2004/0040671 A1 | 3/2004 | Duesel et al. |
| 2004/0045681 A1 | 3/2004 | Bolton et al. |
| 2004/0045682 A1 | 3/2004 | Liprie |
| 2004/0079491 A1 | 4/2004 | Harris et al. |
| 2005/0022989 A1 | 2/2005 | Heins |
| 2005/0074712 A1 | 4/2005 | Brookshire et al. |
| 2005/0230238 A1 | 10/2005 | Klausner et al. |
| 2005/0242036 A1 | 11/2005 | Harris |
| 2005/0279500 A1 | 12/2005 | Heins |
| 2006/0000355 A1 | 1/2006 | Ogura et al. |
| 2006/0032630 A1 | 2/2006 | Heins |
| 2007/0051513 A1 | 3/2007 | Heins |
| 2007/0114683 A1 | 5/2007 | Duesel et al. |
| 2007/0175189 A1 | 8/2007 | Gomiciaga-Pereda et al. |
| 2007/0251650 A1 | 11/2007 | Duesel et al. |
| 2008/0110417 A1 | 5/2008 | Smith |
| 2008/0115361 A1 | 5/2008 | Santini et al. |
| 2008/0164135 A1 * | 7/2008 | Slook ................... B01D 1/0035 202/83 |
| 2008/0173176 A1 | 7/2008 | Duesel et al. |
| 2008/0173590 A1 | 7/2008 | Duesel et al. |
| 2008/0174033 A1 | 7/2008 | Duesel et al. |
| 2008/0213137 A1 | 9/2008 | Frisch et al. |
| 2008/0265446 A1 | 10/2008 | Duesel et al. |
| 2008/0272506 A1 | 11/2008 | Duesel et al. |
| 2008/0277262 A1 | 11/2008 | Harris |
| 2009/0078416 A1 | 3/2009 | Heins |
| 2009/0127091 A1 | 5/2009 | Heins |
| 2009/0294074 A1 | 12/2009 | Forstmanis |
| 2010/0095763 A1 | 4/2010 | Harris |
| 2010/0126931 A1 | 5/2010 | Capeau et al. |
| 2010/0139871 A1 | 6/2010 | Rasmussen et al. |
| 2010/0176042 A1 | 7/2010 | Duesel, Jr. et al. |
| 2010/0224364 A1 | 9/2010 | Heins |
| 2010/0236724 A1 | 9/2010 | Duesel, Jr. et al. |
| 2011/0147195 A1 | 6/2011 | Shapiro et al. |
| 2011/0168646 A1 | 7/2011 | Tafoya |
| 2011/0180470 A1 | 7/2011 | Harris |
| 2011/0240540 A1 | 10/2011 | Harris |
| 2011/0303367 A1 * | 12/2011 | Panz ..................... B01D 1/14 159/16.2 |
| 2012/0211441 A1 | 8/2012 | Harris |

FOREIGN PATENT DOCUMENTS

| | | |
|---|---|---|
| DE | 1 173 429 B | 7/1964 |
| EP | 0 047 044 A1 | 3/1982 |
| FR | 2 441 817 A1 | 6/1980 |
| GB | 383570 A | 11/1932 |
| GB | 463770 A | 4/1937 |
| JP | 60257801 | 12/1985 |
| JP | 62121687 | 6/1987 |

(56) References Cited

FOREIGN PATENT DOCUMENTS

| JP | 2003/021471 A | 1/2003 |
|---|---|---|
| WO | WO-96/10544 A2 | 4/1996 |
| WO | WO-2004/022487 A2 | 3/2004 |
| WO | WO-2005/110608 A1 | 11/2005 |
| WO | WO-2008/112793 A1 | 9/2008 |
| WO | WO-2009/071763 A1 | 6/2009 |
| WO | WO-2010/092265 A1 | 8/2010 |
| WO | WO-2011/042693 A2 | 4/2011 |
| WO | WO-2011/050317 A2 | 4/2011 |
| WO | WO-2012/100074 A2 | 7/2012 |

OTHER PUBLICATIONS

"Waste Heat Recovery Systems," Bionomic Industries, copyright 2008, printed from www.bionomicind.com <http://www.bionomicind.com> on May 25, 2011.
Alabovskij et al., "Concentration of Boiler Washing Water in Submerged-Combustion Devices," *Promyshl. Energet*, 4:38-39 (1975). English-language abstract only.
Bachand et al., "Denitrification in Constructed Free-Water Surface Wetlands: II. Effects of Vegetation and Temperature," Ecological Engineering, 14:17-32 (2000).
Barrett et al., "The Industrial Potential and Economic Viability of Spouted Bed Processes," Chemeca 85, paper D4c, The Thirteenth Australasian Conference on Chemical Engineering, Perth, Australia, pp. 401-405 (1985).
Bennett et al., "Design of a Software Application for the Simulation and Control of Continuous and Batch Crystallizer Circuits," Advances in Engineering Software, 33:365-374 (2002).
Berg, "The Development of the Controlled Buoyancy System for Installation of Submerged Pipelines," Journal AWWA, Water Technology/Quality, pp. 214-218 (1977).
Brandt et al., "Treatment Process for Waste Water Disposal of the "Morcinek" Mine Using Coalbed Methane," Conference on Coalbed Methane Utilization, Oct. 5-7, 1994.
Cherednichenko et al., "Disposal of Saline Wastes From Petroleum Refineries, All-Union Scientific-Research and Planning-Design Institute of the Petroleum Refining and Petrochemical Industry," Khimiya I Tekhnologiya Topliv I Masel, 9:37-39 (1974). Translated.
Claflin et al., "The Use of Spouted Beds for the Heat Treatment of Grains," Chemeca 81, the 9th Australasian Conference on Chemical Engineering, Christchurch, New Zealand, 4:65-72 (1981).
Claflin, "Intraparticle Conduction Effects on the Temperature Profiles in Spouted Beds," Chemeca 85, paper D9b, the Thirteenth Australasian Conference on Chemical Engineering. Perth, Australia, pp. 471-475 (1985).
Cross et al., "Leachate Evaporation by Using Landfill Gas," Proceedings Sardinia 97, Sixth Landfill Symposium, S. Margherita di Pula, Cagliari, Italy, pp. 413-422 (1997).
Dunn, "Incineration's Role in Ultimate Disposal of Process Wastes," *Chemical Engineering, Deskbook Issue*, pp. 141-150 (1975).
Durkee et al., "Field Tests of Salt Recovery System for Spent Pickle Brine," *Journal of Food Service*, 38:507-511 (1973).
English language translation of an office action from Chilean Patent Application No. 237-2007.
English translation of Chinese First Office Action for Application No. 201080012067.7, dated Oct. 12, 2012.
English translation of Chinese Search Report for Application No. 201080012067.7, dated Sep. 12, 2012.
English-language translation of Hage, H., "The MeMon Experiment: A Step towards Large-Scale Processing of Manure," Applied Science, 4 (1988).
Etzensperger et al., "Phenol Degradation in a Three-Phase Biofilm Fluidized Sand Bed Reactor," *Bioprocess Engineering*, 4:175-181 (1989).
Evras—Evaporative Reduction and Solidification Systems; Brochure for Web. Believed to be publically available as early as Mar. 5, 2010.

Fan et al., "Some Remarks on Hydrodynamic Behavior of a Draft Tube Gas-Liquid-Solid Fluidized Bed," AIChE Symposium Series, No. 234(80):91-97 (1985).
Final Office Action for U.S. Appl. No. 11/625,002, dated May 26, 2010.
Final Office Action for U.S. Appl. No. 11/625,022, dated Jan. 24, 2011.
Final Office Action for U.S. Appl. No. 11/625,024, dated Dec. 8, 2010.
Fox et al., "Control Mechanisms of Flulidized Solids Circulation Between Adjacent Vessels," *AIChE Journal*, 35(12):1933-1941 (1989).
Genck, "Guidelines for Crystallizer Selection and Operation," CEP, pp. 26-32 (2004). www.cepmagazine.org.
German Kurz, "Immersion Heater," OI U. Gasfeuerung, 18(3):171-180 (1973). English-language abstract only.
Hattori et al., "Fluid and Solids Flow Affecting the Solids Circulation Rate in Spouted Beds with a Draft Tube," *Journal of Chemical Engineering of Japan*, 37(9):1085-1091 (2004).
Hill et al., "Produced Water and Process heat Combined Provide Opportunities for Shell CO2"; EVRAS; Facilities 2000: Facilities Engineering in the Next Millennium.
Hocevar et al., "The Influence of Draft-Tube Pressure Pulsations on the Cavitation-Vortex Dynamics in a Francis Turbine," *Journal of Mechanical Engineering*, 49:484-498 (2003).
International Preliminary Report on Patentability and Written Opinion issued for International Patent application No. PCT/US2011/021811, dated Aug. 14, 2012.
International Preliminary Report on Patentability for Application No. PCT/US2006/015803, dated Nov. 13, 2007.
International Preliminary Report on Patentability for Application No. PCT/US2006/028515, dated Jan. 22, 2008.
International Preliminary Report on Patentability for Application No. PCT/US2007/001487, dated Jul. 21, 2009.
International Preliminary Report on Patentability for Application No. PCT/US2007/001632, dated Jul. 21, 2009.
International Preliminary Report on Patentability for Application No. PCT/US2007/001633, dated Jul. 21, 2009.
International Preliminary Report on Patentability for Application No. PCT/US2007/001634, dated Jul. 21, 2009.
International Preliminary Report on Patentability for Application No. PCT/US2008/056702, dated Sep. 15, 2009.
International Preliminary Report on Patentability for Application No. PCT/US2010/043647, dated Feb. 9, 2012.
International Preliminary Report on Patentability for Application No. PCT/US2010/043648, dated Feb. 9, 2012.
International Search Report and Written Opinion for Application No. PCT/US08/56702, dated Jun. 10, 2008.
International Search Report and Written Opinion for Application No. PCT/US10/043647, dated Apr. 27, 2011.
International Search Report and Written Opinion for Application No. PCT/US10/043648, dated Apr. 27, 2011.
International Search Report and Written Opinion for Application No. PCT/US2006/015803, dated Oct. 30, 2007.
International Search Report and Written Opinion for Application No. PCT/US2010/024143, dated Oct. 12, 2010.
International Search Report and Written Opinion for Application PCT/US2011/021811, dated Mar. 21, 2011.
International Search Report for Application No. PCT/US2006/028515, dated Nov. 14, 2006.
International Search Report for Application No. PCT/US2012/021897, dated Oct. 8, 2012.
Intevras Technologies, LLC—Innovative solutions for water purification, remediation and process improvement; Power Point Presentation, Oct. 2009.
Jones, "Liquid Circulation in a Draft-Tube Bubble Column," *Chemical Engineering Science*, 40(3):449-462 (1985).
Layne Evaporative Reduction and Solidification System Brochure (2010).
MikroPul, "Wet Scrubbers," (2009). www.mikropul.com.
Miyake et al., "Performance Characteristics of High Speed-Type Cross Flow Turbine," 83-0047:2575-2583 (1993).

(56) References Cited

OTHER PUBLICATIONS

Mueller et al., "Rotating Disk Looks Promising for Plant Wastes," (2007).
Mussatti, Daniel, Section 6, Particulate Matter Controls. Chapter 2 Wet Scrubbers for Particulate Matter. Innovative Strategies and Economics Group. Unisted States Environmental Protection Agency. Jul. 2002.
Notice of Allowance for U.S. Appl. No. 11/625,159, dated Jul. 9, 2010.
Office Action for U.S. Appl. No. 11/625,002, dated Jan. 6, 2010.
Office Action for U.S. Appl. No. 11/625,022, dated Jun. 22, 2010.
Office Action for U.S. Appl. No. 11/625,024, dated Jun. 18, 2010.
Office Action for U.S. Appl. No. 11/625,024, dated Nov. 27, 2009.
Office action from Chilean Patent Application No. 238-2007.
Office Action issued for U.S. Appl. No. 12/705,462, dated Nov. 6, 2012.
Office Action issued for U.S. Appl. No. 12/846,257, dated November 16, 2012.
Padial et al., "Three-Dimensional Simulation of a Three-Phase Draft-Tube Bubble Column," *Chemical Engineering Science*, 55:3261-3273 (2000).
Rule 62 EPC Communication issued from the European Patent Office for Application No. 10741828.7, dated Jan. 31, 2013.
Rule 62 EPC Communication issued from the European Patent Office for Application No. 10805026.1, dated Feb. 27, 2013.
Rule 62 EPC Communication issued from the European Patent Office for Application No. 10805027.9, dated Feb. 5, 2013.
Sathyanarayana et al., Circular C.W. Intake System—A Research Opinion, Seventh Technical Conference of the British Pump Manufacturer's Association, paper 21, pp. 293-313, 1981.
Schone, "Oil Removal from Exhaust Steam and Condensate of Piston-Powered Steam Engines," *Braunkohle*, 31:82-92 (1932). English-language abstract only.
Screen shots from video on LFG website taken Jan. 18, 2011 (http://www.shawgrp.com/markets/envservices/envsolidwaste/swlfg).
Shaw LFG Specialties, LCC "Waste Heat Leachate Evaporator System" (2011).
Shaw LFG Specialties, LLC, 2006 Product Catalog.
Shimizu et al., "Filtration Characteristics of Hollow Fiber Microfiltration Membranes Used in Membrane Bioreactor for Domestic Wastewater Treatment," *Wat. Res.*, 30(10):2385-2392 (1996).
Smith, "Sludge-U-Like, as the Ban on Sea Disposal of Sewage Waste Looms, Technologies That Can Deliver Cleaner, Thicker and More Farmer-Friendly Sludges Are Gaining Popularity," *Water Bulletin*, 708 (1996).
St. Onge et al., "Start-Up, Testing, and Performance of the First Bulb-Type Hydroelectric Project in the U.S.A.," *IEEE Transactions on Power Apparatus Systems*, PAS-101(6):1313-1321 (1982).
Swaminathan et al., "Some Aerodynamic Aspects of Spouted Beds of Grains," Department of Chemical Engineering, McGill University, Montreal, Quebec, Canada, pp. 197-204 (2007).
Talbert et al., "The Elecrospouted Bed," *IEEE Transactions on Industry Applications*, vol. 1A-20, No. 5, pp. 1220-1223 (1984).
U.S. Office Action for U.S. Appl. No. 12/530,484, dated Apr. 16, 2013.
U.S. Office Action for U.S. Appl. No. 12/846,337, dated Apr. 17, 2013.
Williams et al., "Aspects of Submerged Combustion as a Heat Exchange Method," *Trans IChemE*, 71(A):308-309 (1993).
Written Opinion for Application No. PCT/US2010/024143, dated Oct. 12, 2010.
Written Opinion for Application No. PCT/US2012/021897, dated Sep. 28, 2012.
Ye et al., "Removal and Distribution of Iron, Manganese, Cobalt, and Nickel Within a Pennsylvania Constructed Wetland Treating Coal Combustion By-Product Leachate," *J. Environ. Qual.*, 30:1464-1473 (2001).
Yeh et al., "Double-Pass Heat or Mass Transfer Through a Parallel-Plate Channel with Recycle," *International Journal of Hat and Mass Transfer*, 43:487-491 (2000).
Yoshino et al., "Removal and Recovery of Phosphate and Ammonium as Struvite from Supernatant in Anaerobic Digestion," *Water Science and Technology*, 48(1):171-178 (2003).
U.S. Appl. No. 13/849,274, filed Mar. 22, 2013.

\* cited by examiner

FLUID EVAPORATOR FOR AN OPEN FLUID RESERVOIR

RELATED APPLICATIONS

This application is a divisional of U.S. patent application Ser. No. 13/849,274, filed Mar. 22, 2013, the entirety of which is hereby incorporated by reference herein.

BACKGROUND

1. Field of the Disclosure

The present invention relates to devices and methods for evaporating fluids from an open fluid reservoir, which in some applications may be used to accelerate the rate of concentration of suspended solids therein with or without the feature of promoting or maintaining aerobic conditions within the open fluid reservoir.

2. Background Art

Water and other fluids often accumulate various contaminants, and it is often desirable or necessary to separate the fluid from the contaminant to meet various purity targets or reduce the volume of liquid within an open reservoir, which may be necessary for practical, legal, or other reasons. Such contaminants may include, for example, salts, sulfur, heavy metals, suspended soils, human or animal waste, oils, fertilizers, pharmaceuticals, acid and any other undesirable matter as would be apparent to a person of skill in the art. The sources for contaminated fluids, also called effluent, are many, such as acid mine runoff, petrochemical processing fluids, agricultural runoff, municipal waste water and storm water runoff, and industrial process effluent, to name just a few examples. Frequently, the fluid to be treated is water, although clearly other fluids may need to have contaminants separated therefrom. For the purposes of this application, however, the exact fluid, contaminant, and source of contaminant is not particularly relevant, and so the terms water and contaminant will be used generically to include any fluid and matter, respectively, that one would desire to treat or purify, unless otherwise clearly indicated.

Outdoor open fluid reservoirs, such as retention ponds, aeration reservoirs, dry ponds, open-topped tanks, and the like, are often used to temporarily store effluent that contains undesirable levels of contaminants until the effluent can be treated to separate the contaminant from the water. After separation, the cleaned water can be released to the environment or otherwise used as desired, and the contaminant and/or concentrated effluent can be further processed, recycled, transported to an appropriate landfill, or otherwise disposed of.

When the contaminant is not a volatile substance, one commonly used method of separating the contaminant from the water is to evaporate the water from the effluent, thereby releasing clean water into the atmosphere in the gaseous state in the form of vapor while the contaminant is retained and/or re-captured in the reservoir. Depending on the circulation of effluent into the reservoir, after some period of time the water is either completely evaporated, thereby leaving the contaminants remaining in the reservoir for easy collection and disposal, or the concentration of contaminant is elevated to a point, such as saturation, where it becomes economically advantageous to further process and/or separate the highly concentrated effluent in other ways.

Although the water evaporates naturally at the surface of a pond or other outdoor reservoir, it is often desirable to increase the rate of evaporation to decrease the processing time of the effluent in order to increase economic efficiencies. Thus, it is common to place a reservoir evaporator system directly in the reservoir that effectively accelerates evaporation of the water to the surrounding environment by, for example, increasing the surface area to volume ratio of the effluent to the surrounding air. There are many ways to accomplish this, and of course, the efficacy of this evaporative treatment method is highly dependent on many variables other than the evaporator system, including flow rate of effluent into or through the reservoir, humidity levels of the surrounding environment, the fluid to be evaporated, and temperature, to name a few.

One known type of reservoir evaporator system uses nozzles to spray a fine mist of droplets of the effluent up into the air above the top surface of the reservoir. Under ideal conditions, the water in the droplets evaporates into the surrounding atmosphere more quickly than from the top surface because of the increased surface area to volume ratio, and the contaminants and any un-evaporated droplets fall back into the reservoir. An exemplary reservoir evaporation system generally incorporating this design is disclosed in U.S. Patent Application Publication No. 2010/0139871 to Rasmussen et al. A problem with these misting-types of reservoir evaporation systems, however, is that under non-ideal conditions the contaminates and un-evaporated droplets may be borne by winds away from the reservoir and settle out at nearby areas rather than in the reservoir. This could lead to unwanted deposition of the contaminates in surrounding areas, such as residential or other built-up areas, or uncontrolled release of the contaminates into surrounding environments, all of which are forms of multi-media pollution. Additionally, such systems frequently require a supply of high pressure to force the effluent through a nozzle and adequately aerosolize the effluent into the surrounding air.

Another known type of reservoir evaporator system floats on the top surface of the reservoir and includes a spinning agitator for scooping effluent from the top surface and sprinkling it into the air. The agitator is connected to a source of high pressure air that spins the agitator by means of thrust nozzles, and the exhaust from the thrust nozzles may be directed to further impact the effluent sprinkled into the air to further accelerate evaporation. An exemplary reservoir evaporation generally incorporating this design is disclosed in U.S. Pat. No. 4,001,077 to Kemper. In addition to the potential of causing multi-media pollution, another drawback to these systems is the need to use moving parts, which can frequently break or become jammed through buildup of scale from the contaminants.

Additionally, the inclusion of a high pressure air or liquid supply in each of these reservoir evaporator systems can increase complexity, cost, and maintenance requirements.

A further known type of reservoir evaporator system that dispenses with the use of high pressure air exposes evaporation surfaces that have been wetted with the effluent to the air and wind. One exemplary reservoir evaporation system generally incorporating this design is disclosed in U.S. Pat. No. 7,166,188 to Kadem et al. These designs, while overcoming the problem of drift to surrounding areas, may often require extensive maintenance to keep the evaporation surfaces free of contaminant buildup and often require complex mechanical and/or effluent transfer systems for dispersing the effluent onto the evaporation surfaces.

In view of this existing state of the art, the inventors of the present application have developed a reservoir evaporation system that overcomes in various aspects many of the drawbacks associated with the current systems.

SUMMARY

According to one aspect, a fluid evaporator for evaporating fluid from an open fluid reservoir includes a partially enclosed vessel having an upper chamber and a lower chamber. The vessel is arranged to be operatively positioned in the fluid reservoir with the upper chamber disposed above a top surface of the fluid and the lower chamber disposed in the fluid. The vessel has a first opening through a lower portion of the lower chamber, and a gas supply tube extends into the lower chamber and has an air outlet disposed between the opening through the lower portion of the lower chamber and an upper portion of the lower chamber. An exhaust opening through the upper chamber is in fluid communication with the air outlet. The fluid evaporator also has a discharge conduit that has an inlet in fluid communication with the lower chamber and an outlet disposed below the lower chamber, wherein the inlet is separated from the lower portion of the chamber by a weir. When operatively positioned in the fluid reservoir, fluid from the fluid reservoir can enter into the lower chamber through the first opening, the air outlet is positioned to inject air into the fluid underneath the top surface, the air injected from the air outlet can exhaust out of the upper chamber through the exhaust opening, and the inlet is located below the top surface of the fluid.

A fluid evaporator according to another aspect includes a vessel having an upper chamber and a lower chamber, wherein the lower chamber is defined by an annular wall having an open bottom end and an upper end separated from and in fluid communication with the upper chamber, and an exhaust outlet through the upper chamber. A gas supply tube extends into the lower chamber and has an outlet operatively disposed between the bottom end of the annular wall and the upper end, wherein the gas supply tube and the annular wall define an annular space therebetween. The fluid evaporator further includes a fluid outlet pipe having an inlet and a discharge outlet. The inlet is in fluid communication with the lower chamber and disposed between the exhaust outlet and the bottom end of the lower chamber, and the fluid outlet pipe extends away from the inlet along the lower chamber.

According to a further aspect, a fluid evaporator for evaporating fluid from an open fluid reservoir includes a partially enclosed vessel having an upper chamber and a lower chamber, a flotation means with the vessel, a first opening through a lower portion of the lower chamber, a gas supply tube extending into the lower chamber and having an air outlet disposed between the opening through the lower portion of the lower chamber and an upper portion of the lower chamber, and an exhaust opening through the upper chamber and in fluid communication with the air outlet. The flotation means is located to cause the chamber to float operatively positioned on the top surface of the fluid in the fluid reservoir with the upper chamber disposed above the top surface of the fluid and the bottom chamber disposed in the fluid. When operatively positioned in the fluid reservoir, fluid from the fluid reservoir can enter into the lower chamber through the first opening, the air outlet is positioned to inject air into the fluid underneath the top surface, and the air injected from the air outlet can exhaust out of the upper chamber through the exhaust opening.

According to yet another aspect, a fluid evaporator includes a vessel having an upper chamber and a lower chamber, wherein the lower chamber is defined by an annular wall having an open bottom end and an upper end in fluid communication with the upper chamber, an exhaust outlet through the upper chamber. A gas supply tube extends into the lower chamber and has an outlet operatively disposed between the bottom end of the annular wall and the upper end, wherein the gas inlet tube and the annular wall define an annular space therebetween. A flotation device is associated with the vessel. The flotation device is arranged to cause the vessel to float in a pool of liquid with the bottom end of the annular wall disposed beneath a top surface of the pool and the upper chamber projecting upwardly from the top surface of the pool.

According to yet a further aspect, a reservoir evaporation system for evaporating fluid from an open reservoir of effluent containing a fluid and a contaminant includes a fluid evaporator, an air pump, and an air supply conduit functionally connecting the fluid evaporator with the air pump. The fluid evaporator includes a vessel with an upper chamber and a lower chamber, wherein the vessel is adapted to float in an operative position partially submerged on a top surface of the effluent in the reservoir with the lower chamber submerged in the effluent and the upper chamber extending above the top surface of the effluent. The vessel further includes a first opening into a lower portion of the lower chamber to allow the effluent to enter the chamber, and an exhaust opening into the upper chamber disposed to be above the top surface of the effluent and in communication with the lower chamber. The air supply conduit has an outlet arranged to discharge forced air into the lower portion of the chamber. When the fluid evaporator is in the operative position, air from the air pump can be injected into effluent in the lower chamber and subsequently travel through the upper chamber to be discharged from the vessel through the exhaust opening. By this arrangement fluid from the effluent in the lower chamber can be separated from the contaminant by evaporation.

A method of evaporating fluid from an open reservoir of fluid having a top surface according to an additional aspect includes the step of floating a fluid evaporator comprising a vessel at the top surface of the fluid in a partially submerged state. A bottom end of the vessel is submerged in the fluid and a top end of the vessel is disposed above the top surface of the fluid. A first opening through a lower portion of the vessel allows the fluid to enter the vessel, and an exhaust opening through a covered upper portion of the vessel disposed above the top surface of the fluid is in communication with the lower portion of the vessel. The method further includes the steps of forcing air into the fluid in the lower portion of the vessel through an outlet of an air supply conduit with the outlet disposed below the top surface of the fluid, aerating the fluid inside the lower portion of the vessel with the air, and discharging the air after aerating through the covered upper portion of the chamber to the exhaust opening. In this process fluid in the lower portion of the chamber is evaporated in the discharged air.

In still another aspect, a fluid evaporator includes a vessel arranged to float at the surface of a body of water with an upper chamber disposed above the water and a lower chamber disposed in the water, a gas supply tube having an outlet operatively disposed in the lower chamber, a gas flow path from the lower chamber to the upper chamber, and an exhaust outlet from the upper chamber. A bustle is operatively disposed between the gas flow path and the exhaust outlet and arranged to provide substantially uniform mass flow of gases at all circumferential locations around the bustle from a region inside the bustle radially outwardly to a region outside of the bustle to the exhaust outlet.

These and other aspects of the disclosure will be apparent in view of the following detailed description, claims, and the drawings.

DETAILED DESCRIPTION

Figure 1:
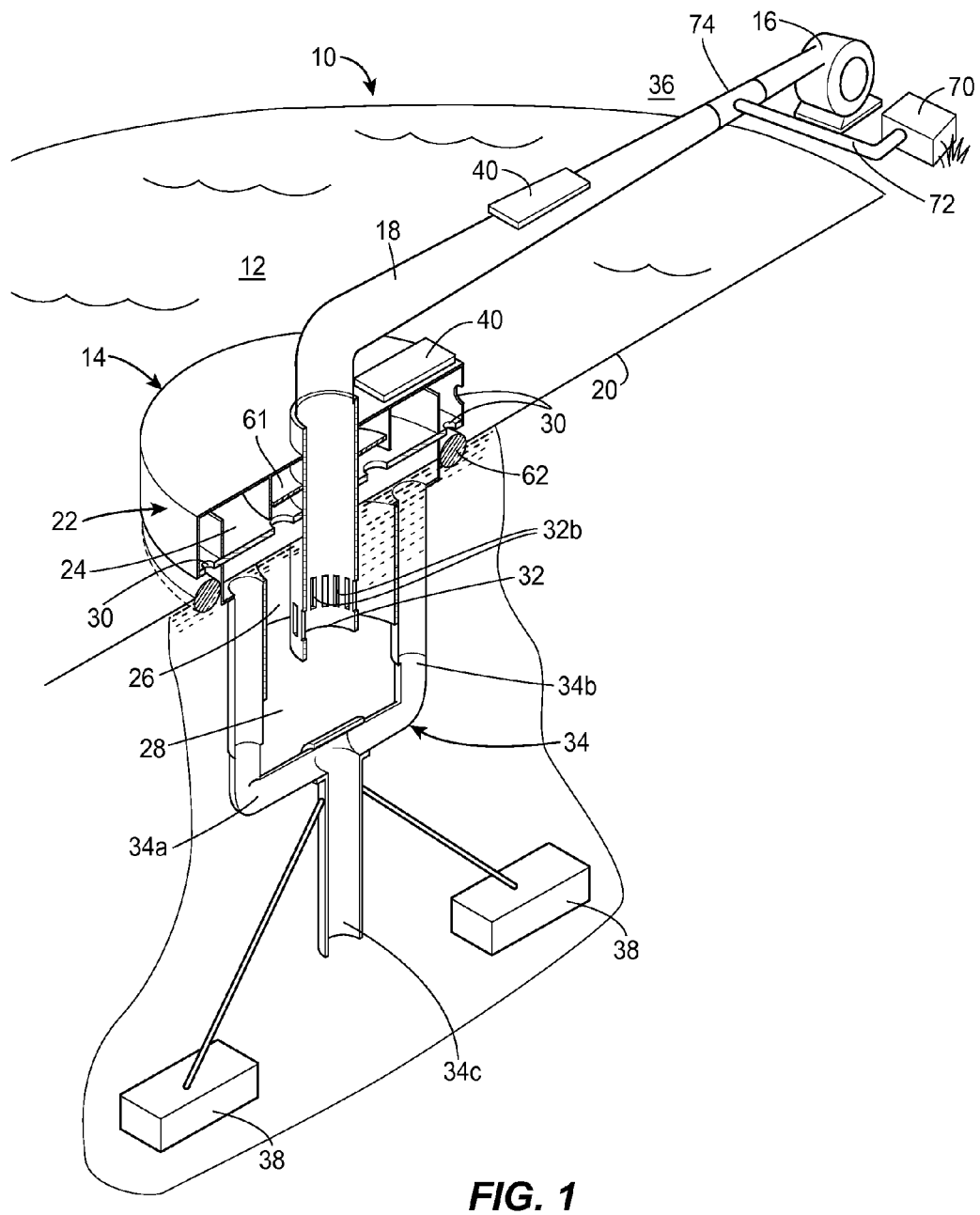
FIG. 1 is a perspective view of a reservoir evaporation system including a fluid evaporator of the disclosure in an retention pond.

Turning now to the drawings, FIG. 1 shows a reservoir evaporation system 10 being used for evaporating liquid from an open reservoir of effluent 12 according to one aspect. As exemplified in FIG. 1, the reservoir may be an outdoor body of fluid, such as a pond, lake, retention pond, or dry pond. The reservoir, however, is not limited to any particular type of reservoir, and could include holding tanks, settling vessels, etc. Rather, the evaporation systems 10 disclosed herein may be used with any body of open water or other type of fluid. In one anticipated use, the reservoir may be a collection pond for effluent 12 including acid mine runoff. For simplicity, the following detailed description refers to effluent, but it is understood that the principles described herein may be used for evaporating uncontaminated fluids in the same manner and the disclosure is not to be limited to only use with contaminated fluids.

The reservoir evaporation system 10 includes a fluid evaporator 14, an air pump 16, and an air supply conduit 18 operatively connecting the fluid evaporator and the air pump. The fluid evaporator 14, which in this example may also be called a pond concentrator, is designed to increase the rate of evaporation of fluid from the effluent 12 by forcing air into effluent within the confines of the fluid evaporator and allowing controlled release of moist exhaust air containing water vapor after mixing with the effluent to reduce, control, and/or eliminate dispersion of entrained effluent with the exhaust air into the surrounding atmosphere. This separates the fluid in the effluent, such as water, from the contaminants by evaporating the fluid to the surrounding environment with the moist exhaust air while leaving contaminants, such as sulfur, salts, and suspended solids, in the effluent. Preferably, air from the air pump 16 is intimately mixed with effluent 12 inside the fluid evaporator, and the moist exhaust air travels through an enclosed exhaust pathway through the fluid evaporator 14 from the surface of the effluent to an exhaust port. As the exhaust air travels along the exhaust pathway, entrained effluent droplets or contaminants are removed from the exhaust air by contacting and collecting on the walls of the exhaust pathway and demister structures, such as baffles, screens, and/or other collection structures. Thus, the exhaust pathway preferably follows a tortuous path through the fluid evaporator between the top surface 20 of the effluent inside the fluid evaporator to the exhaust port to increase contact of the exhaust air with collection surfaces and demister structures before the exhaust air escapes from the fluid evaporator.

To accomplish this controlled evaporation and separation, the fluid evaporator 14 is operatively positioned in the reservoir such that it is partially submerged in the effluent 12. The operative position is preferably such that a top end of the fluid evaporator is disposed above the top surface 20 of the effluent 12 and a bottom end or portion of the fluid evaporator is submerged in the effluent. It should be noted that all directional descriptors, such as up, down, top, bottom, left, right, etc., are used herein for convenience of description in view of the operative positions illustrated in the drawings and are not intended as limitations on the scope of the disclosure. In a preferred arrangement, the fluid evaporator 14 has a body defining a partially enclosed vessel 22 that floats or is otherwise maintained in a position in the reservoir such that the top surface of the effluent is located between an upper chamber 24 of the vessel and a lower chamber 26 of the vessel. An opening 28 through a submerged portion of the fluid evaporator 14 allows effluent to enter into the lower chamber 26, and the lower chamber is separated from and in fluid communication with the upper chamber 24, which projects above the top surface 20 of the effluent 12. The upper chamber 24 at least partly defines the exhaust path from the top surface 20 of the effluent to one or more exhaust ports 30 located above the top surface 20 of the effluent 12 to the surrounding environment. The air supply conduit 18 has a discharge outlet 32 disposed inside the lower chamber arranged to be located below the top surface 20 of the effluent 12. The discharge outlet 32 includes an open end 32*a* of the conduit 18 at the lower end of the conduit and a plurality of sparge ports 32*b*, preferably in the form of vertical slots spaced around the conduit, spaced above the open lower end 32*a*. Thus, in the operative position, the air pump 16 can force air through the air supply conduit 18 and entrain the air in the effluent while contained inside the lower chamber 26, where the air can mix vigorously with the effluent inside the lower chamber 26, thereby allowing fluid from the effluent to evaporate more rapidly with the entrained air. In a preferred arrangement, all of the air enters the lower chamber 26 through the sparge ports 32*b* and the open end 32*a* is extended below the level of the sparge ports 32*b* so that the air does not flow through the open end 32*a* at the bottom of the air supply conduit 18. However, the open end 32*b* prevents build up of nuisance debris over time and acts as a pressure relief valve should the slots through which the air enters the lower chamber were to become plugged, such as with scale. Further, the column of water beneath the sparge ports 32*b* in some arrangements may also serve as a fluid "spring" to suppress possible pulsation of air flow into the lower chamber 26 and thereby promote symmetry of airflow through the fluid evaporator 14, thus promoting smooth operating characteristics. The air then can move naturally to the top surface 20 of the effluent and be released as moist exhaust air. The moist exhaust air then can travel through the exhaust pathway in the upper chamber 24 and out of the fluid evaporator 14 through the exhaust ports 30, while concentrated effluent and contaminants will be trapped within the fluid evaporator. In this manner, the fluid can be evaporated and separated out from the contaminants without allowing uncontrolled dispersion of the effluent into the surrounding environment.

In a further optional arrangement, the fluid evaporator 14 includes a fluid discharge conduit 34 through which aerated effluent from the lower chamber 26 can be discharged downwardly into the reservoir, thereby aerating the reservoir simultaneously while evaporating the fluid. One arrangement includes two discharge tubes 34a, 34b on opposite sides of the fluid evaporator that merge into a single discharge riser 34c below the vessel 22. The discharge riser 34c extends downwardly toward the bottom of the reservoir. This arrangement allows the fluid evaporator 14 to oxygenate the effluent in the reservoir from the bottom up as opposed to from the top down as accomplished by common aeration devices that spray water upwardly into the atmosphere and simply allow the aerated spray to return to the surface of the pond. This also provides a significant advantage over common aerators by providing a better way to promote aerobic digestion and/or provide oxygen to aquatic plants and animals while preventing anaerobic bacterial action from producing undesirable reduced compounds, such as sulfides, ammonia, and methane.

The fluid evaporator 14 may be maintained in the operative position at the top surface of the effluent by any convenient mechanism, such as support legs, a suspension structure, or floatation by, for example, displacement of water by captive air. Preferably, the fluid evaporator 14 floats on the top surface of the effluent 12 by means of a suitable flotation mechanism. This can be particularly advantageous when, for example, the reservoir is not continually replenished and the level of the effluent 12 drops or rises significantly. By floating on the top surface, the fluid evaporator 14 can move up and down with the level of the effluent 12 and thereby remain in the operative position over a large range of depths of the reservoir. In other applications where the level of the reservoir will remain relatively constant, support means such as legs, support brackets, or suspension mechanisms, may be equally sufficient to maintain the fluid evaporator 14 in its operative position.

In a preferred operative arrangement, one end of the air supply conduit 18 is connected to the air pump 16 and the opposite of the air supply conduit end is connected to the fluid evaporator 14, whereby the air pump can force air through the air supply conduit into the fluid evaporator. The air pump 16 may be any device that is operative to force air or other gasses to the fluid evaporator, such as a fan or other type of air blower. Other possible air pumps could include positive displacement pumps, air compressors, and/or other known gas pumps.

The air pump 16 can be located anywhere capable of being operatively connected with the fluid evaporator 14. As shown in FIG. 1, the air pump 16 is located remote from the fluid evaporator 14 in a fixed position on the bank 36 of the reservoir and is connected with the fluid evaporator by a tube, such as a pipe or flexible hose. Preferably, the air supply conduit 18 is a floating flexible delivery tube. This arrangement allows easy access to the air pump 16 for connection to electrical power, operation, and maintenance, while simultaneously providing flexibility for placement of the fluid evaporator 14 in the reservoir. Of course, the air pump 16 need not be located on the edge of the reservoir, but alternatively may be located at a fixed position inside the reservoir, such as on a platform, or may be disposed on a movable platform for ease of adjustment.

Power may be supplied to the air pump 16 by any suitable means as would be apparent to a person of skill in the art. For example, the air pump 16 may include an electric motor that is connected with a common alternating current electric supply by appropriate wiring. The electric motor also may be powered by photovoltaic cells. Another contemplated arrangement is to drive the air pump 16 with an internal combustion engine having a power take off, belt, chain, or other drive transfer arrangement known in the art operatively connected for driving the air pump.

Another possible configuration is to place the air pump 16 directly on or to be otherwise carried by the fluid evaporator 14. In this configuration, the air pump 16 may include a power and drive mechanism that is associated directly therewith, such as photovoltaic panels and circuitry and/or a diesel generator or engine unit, to provide power to the air pump. Further, the air supply conduit 18 in such an arrangement may be much shorter and simply extend from a fan, for example, to an outlet disposed in a preferred operative location inside the fluid evaporator 14 without extending across the effluent.

When adapted to float at the surface of the effluent, the fluid evaporator 14 optionally may be maintained in a selected position or area of the reservoir with one or more anchors 38. The anchors 38 may have any form suitable to maintain the fluid evaporator 14 in a selected position. One preferred anchoring system as shown in the drawings includes weights, such as concrete blocks or common boat anchors that are tethered to the fluid evaporator 14 and rest on the bottom of the reservoir. Other anchoring systems, however, could also be used as would be apparent to a person of skill in the art.

One or more solar thermal energy collectors 40 optionally may be connected with the fluid evaporator 14 to provide additional heat for increasing the rate of evaporation of fluid from the effluent 12. The solar thermal energy collectors 40 may be any device suitable for collecting solar thermal energy and concentrating the collected thermal energy to provide increased heat, such as solar hot water or gas panels, parabolic collectors, flat plate collectors, evacuated tube collectors, and/or other solar thermal energy collectors as would be apparent to a person of skill in the art. The solar thermal energy collectors 40 may be used to directly heat the body of the fluid evaporator 14, to directly heat the effluent in the fluid evaporator, and/or to heat the air supply that is forced into the fluid evaporator. In one arrangement, a solar thermal energy collector 40 is carried by and warms the body of the fluid evaporator 14. In this arrangement, the elevated temperature of the fluid evaporator 14 warms the air and effluent in contact therewith and thereby increases the rate of evaporation of fluid from the effluent. In another arrangement, a solar thermal energy collector 40 is located to warm the air supply upstream from the fluid evaporator 14. In this arrangement, the solar thermal energy collector 40 may, for example, include a solar air heat collector connected with the air supply conduit 18 and/or the air pump 16 to heat the air supply.

In addition or alternatively to using a solar thermal energy collector 40, the air supply conduit 18 and/or the fluid evaporator 14 optionally may be coated with an energy absorbent coating that further collects solar energy to warm the system. For example, it may be advantageous to paint portions of the fluid evaporator 14 and the air supply conduit 18 that are exposed to direct sunlight in the operative position with a dark coating, such as black paint, to absorb further solar thermal energy. Other solar energy absorptive coatings may also or alternatively be used as would be apparent to a person of skill in the art.

Figure 2:
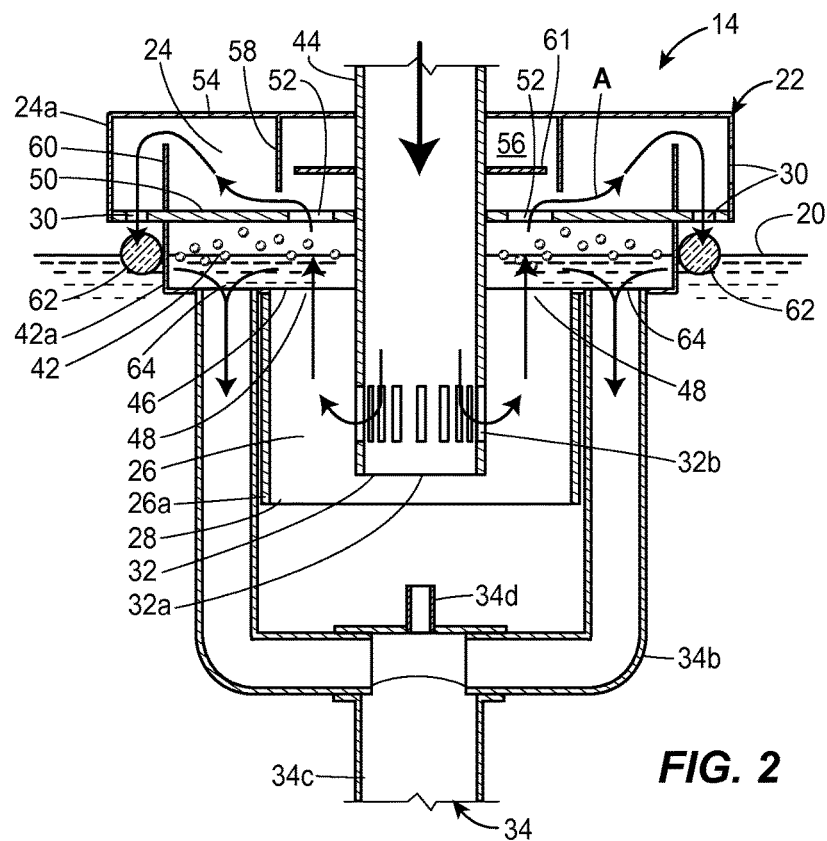
FIG. 2 is a detailed cross-sectional view of the fluid evaporator along the line A-A of FIG. 3.
Figure 3:
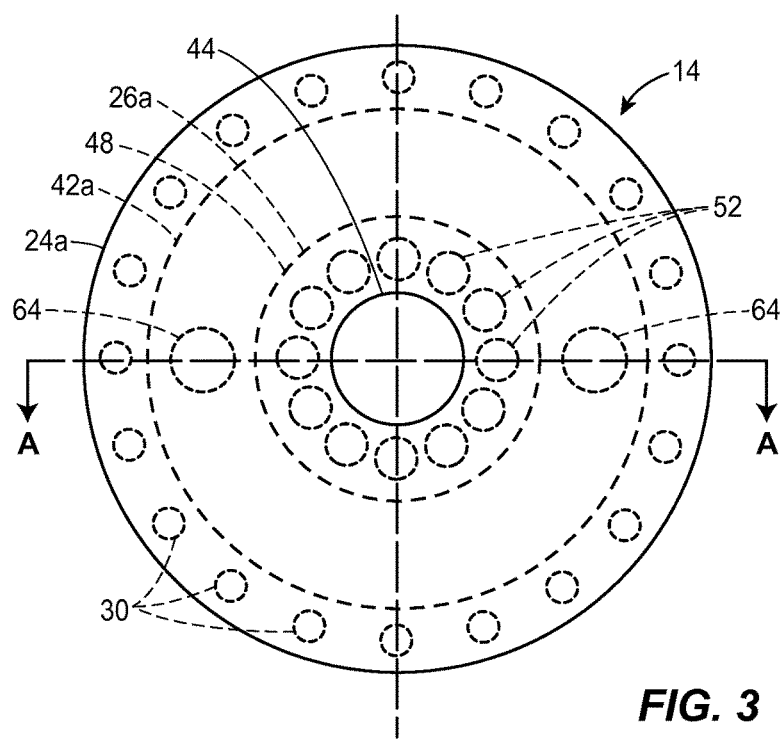
FIG. 3 is a detailed top plan view of the fluid evaporator.

Turning now to FIGS. 2 and 3, detailed views of the fluid evaporator 14 according to one preferred design are shown. According to this arrangement, the vessel 22 also has a middle chamber 42, connected to a bottom end of the top chamber 24 and connected to a top end of the lower chamber 26. The lower chamber 26 is in fluid communication with the middle chamber 42, and the middle chamber 42 is in fluid communication with the upper chamber 24, whereby fluid, such as air or water vapor, may pass from the lower chamber to the middle chamber to the upper chamber along an exhaust path as shown by arrows A in FIG. 2. The upper, middle, and lower chambers 24, 42, 26 are stacked sequentially on top of each other and are coaxially aligned with an air supply downcomer 44 that is attached to the air supply tube from the air pump 16. Such axial alignment is not necessary for the functioning of the fluid evaporator, however, and is described only as one preferred arrangement. Further, the air supply downcomer 44 and the air supply tube together define an operative portion of the air supply conduit 18 in an operative position.

Preferably, the vessel 22 is wider at the top than at the bottom. In one arrangement, the lower chamber 26 has a first width, the middle chamber 42 has a second width larger than the first width, and the upper chamber 24 has a third width larger than the second width. When the chambers have circular footprints, as depicted in the drawings, the widths may be equal to the respective diameters of the chambers. In other form factors, however, such as rectangular, polygonal, or elliptical, the widths refer to other width measurements across the footprints of the chambers. Although the successively larger widths of the lower, middle, and upper chambers 26, 42, 24 is not necessary for the fluid evaporator 14 to function, increasing the widths and cross-sectional footprint areas of the chambers from bottom to top along the exhaust path A can improve at least separation of effluent and contaminants from the exhaust air as compared with a vessel having a constant width. The successively larger widths also allow for more stable flotation of the fluid evaporator 14 where captive air within upper chamber 24 and middle chamber 42 is used to provide buoyancy while the pond evaporator 14 is operating.

The lower chamber 26 is formed by a first annular wall 26a that forms a weir with an open bottom end. The first annular wall 26a preferably is in the form of a circular tubular section; however, the annular wall 26a may have any desired shape that will encompass an annular space between the air supply downcomer 44 and an inner annular surface of the first annular wall 26a for defining an aeration mixing chamber. The middle chamber 42 is formed by a second annular wall 42a in the form of a circular tubular section with a larger diameter than the first annular wall 26a. The upper chamber 24 is formed by a third annular wall 24a in the form of a circular tubular section with a larger diameter than the second annular wall 42a. The chambers 24, 26, 42 need not be circular, however, and could take any other shape sufficient to provide the functions of the fluid evaporator 14 discussed herein as would be apparent to a person of skill in the art.

A first horizontal baffle 46 is disposed across the bottom end of the second annular wall 42a and separates the lower chamber 26 from the middle chamber 42. The first horizontal baffle 46 has an opening 48 that preferably matches the size and shape of the top of the first annular wall 26a, which in the present embodiment is circular, to provide for fluid communication between the lower chamber 26 and the middle chamber 42. Thus, the opening 48 acts as an extension of the lower chamber 26 through the horizontal baffle 46 so that aerated effluent 12 passing upwardly within the annular space between the downcomer 44 and the first annular wall 26a overflows radially outwardly over the first horizontal baffle 46 to provide smooth radial flow and allow air and evaporated moisture to separate cleanly from the effluent 12. The first horizontal baffle 46 also forms a first annular shoulder extending between the bottom end of the second annular wall 42a and the top end of the first annular wall 26a.

A second horizontal baffle 50 is disposed across the bottom end of the third annular wall 24a and separates the upper chamber 24 from the middle chamber 42. The second baffle 50 has at least one second opening 52 therethrough to provide for fluid communication from the middle chamber 42 to the upper chamber 24. A preferred arrangement includes a plurality of second openings 52 through the second horizontal baffle 50, each opening arranged to provide fluid communication from the middle chamber 42 to the upper chamber 24. As best seen in FIG. 3, one possible arrangement includes twelve circular apertures 52 through the second horizontal baffle 50 in a regular radial array surrounding the air supply downcomer 44 and radially aligned with the first opening 48. The second horizontal baffle 50 also forms a second annular shoulder extending between the bottom end of the third annular wall 24a and the top end of the second annular wall 42a.

The upper chamber 24 is covered with a top plate 54. The air supply downcomer 44 extends through apertures through the center of the top plate 54 and the first and second horizontal baffles 46, 50. The upper chamber 24 thereby forms a plenum 56 around the downcomer 44 in the upper chamber 24 at the top of the fluid evaporator 14 that can serve both as a part of the exhaust pathway A and as a flotation means to help the fluid evaporator float on the top surface 20 of the reservoir.

At least one exhaust port 30 through an outer wall of the upper chamber 24 allows exhaust air to escape from inside the upper chamber to the surrounding environment. The exhaust port 30 may be directed downwardly, radially outwardly, and/or upwardly from the upper chamber. In one preferred arrangement, as best seen in FIGS. 2 and 3, twenty circular exhaust ports 30 are directed through the second horizontal baffle 50 toward the lower chamber 26 between the third annular wall 24a and the second annular wall 42a. In this arrangement, the exhaust ports 30 are directed downwardly when the fluid evaporator 14 is in the operative position and direct the exhaust air downwardly against the top surface 20 of the effluent 12 in the reservoir. This can further ensure that any remaining droplets of effluent or other contaminants carried by the moist exhaust air impinge on the top surface of 20 of the effluent 12 in the reservoir allowing a significant proportion of the droplets coalesce with the effluent 12 and remain captured in reservoir 12, thereby preventing uncontrolled drift of effluent or contaminants to surrounding areas by the wind. In another contemplated arrangement, the exhaust ports 30 optionally include one or more horizontally directed openings through the third annular wall 24a.

Demisting structures preferably are incorporated in and/or across the exhaust path through the upper chamber. In the depicted example, first and second vertical baffles 58, 60, in the form of vertical annular walls, extend partially between the second baffle 50 and the top plate 54 and are spaced apart radially outwardly from the second openings 52. The second vertical baffle 60 effectively forms an upward extension from the top end of the second annular wall 42a and extends part way up from the second horizontal baffle 50 to the top plate 54, thereby forming an opening between the top of the baffle and the top plate. The first vertical baffle 58 extends downwardly from the top plate 54 part way to the second horizontal baffle 50, thereby forming another opening between the bottom of the first vertical baffle 58 and the second horizontal baffle 50. With the two openings vertically displaced from each other, the first and second vertical baffles 58, 60 cause the exhaust path A to have a tortuous route from the second openings 52 to the exhaust ports 30 and thereby act as demister devices. A third baffle 61 in the form a horizontal circular flat plate ring is affixed to the outer diameter of the downcomer tube 44 inside the upper chamber 24. The baffle 61 is spaced beneath the top plate 54 and spaced within several inches above the second horizontal baffle 50. Preferably, the baffle 61 extends radially to the radial extent of the second openings 52 between the middle and upper chambers. The baffle 61 is preferably arranged to provide additional tortuous flow path to help mitigate carryover of liquid droplets into the air exhaust pathway. Of course, any number of arrangements of baffles, tortuous pathways, screens and/or other devices that can act to collect fluids and contaminants carried by the exhaust air can be used as would be apparent to a person of ordinary skill in the art.

The air supply downcomer 44, when functionally connected with the air pump 16, defines an end of the portion of the air supply conduit 18. Preferably, the downcomer 44 is disposed within the confines of the lower chamber 26 so that the open end 32a of the discharge outlet 32 is disposed below the top surface 20 of the effluent 12 and spaced vertically between the open bottom end 28 of the first annular wall 26a and the top end of the lower chamber 26 when the fluid evaporator 14 is in the operative position. Preferably, each of the slits forming the sparge ports 32b is identical, positioned above the open end 32a, and symmetrically spaced from each other around the circumference of the wall of downcomer 44 to aid in dispersing air uniformly into the effluent 12 within the annular space 26 when the fluid evaporator 14 is in the operable position.

The fluid evaporator 14 optionally includes means for causing the vessel to float at the top surface of the reservoir. One flotation means may include the plenum 56 in the upper chamber 24 as described previously. Another flotation means includes one or more buoyant flotation devices 62 that are attached to the vessel or other portions of the fluid evaporator. The buoyant flotation devices may be foam structures, enclosed air bladders, hollow fully enclosed air tanks, wood blocks, or other buoyant structures suitable to cause the fluid evaporator to float in the operative position. In a preferred arrangement, the flotation means causes the vessel 22 to float in the operative position with the top level 20 of the effluent extending between the upper and lower chambers 24, 26, and more preferably through a middle elevation of the middle chamber 42. Thus, one possible arrangement of the flotation devices 62 may include foam blocks or rings attached to the exterior of the vessel 22, for example on the outside of the second annular wall 42a. Of course, the exact location of the flotation devices 62 will vary depending on the type of flotation device, weight of the fluid evaporator 14, type of effluent 12, and so on. Preferably the flotation devices 62 are attached to the vessel or other portions of the fluid evaporator so as to be adjustable up and down in the vertical plane to allow adjustment of operable height of the fluid evaporator 14, which is especially desirable to accommodate variances in the specific gravity of effluent 12.

The fluid evaporator 14 optionally also includes the fluid discharge conduit 34 in the form of one or more discharge pipes, shown in FIG. 2 as two discharge pipes 34a, 34b extending downwardly from the middle chamber 42 that merge into the single vertical riser pipe 34c spaced below the bottom of the annular wall 26a. One end of the fluid discharge conduit forms inlets 64 in fluid communication with the lower chamber 26, and the other end of the fluid discharge conduit is directed downwardly into the reservoir. Preferably, the one end of each discharge pipe 34a, 34b extends through the first horizontal baffle 46 in the first annular shoulder and the inlet 64 is disposed below the top surface 20 of the effluent 12 in the operative position. The ends of the discharge pipes 34a, 34b may be flush with the first baffle 46 or may extend upwardly into the middle chamber 42 as long as the inlet 64 into the discharge pipe is below the top surface 20 of the effluent in the operative position. The discharge pipes 34a, 34b are preferably disposed on diametrically opposite outer radial sides of the lower chamber 26, extend downwardly adjacent the exterior of the lower chamber, and merge at a junction into the single discharge riser 34c. A small air vent tube 34d that is oriented vertically upward is placed along the non-vertical section of discharge pipes 34a and 34b in order to vent air that might be carried as bubbles within effluent flowing through discharge pipes 34a and 34b into discharge pipe 34c to prevent any such air bubble from coalescing into a pool of buoyant air that could cause vapor lock that hinders effluent flow. The vent tube 34d is preferably located at the junction of discharge pipes 34a and 34b. In this arrangement, the anchors 38 may be connected to discharge riser 34c and/or the discharge riser may be attached directly to a retention structure to maintain the fluid evaporator 14 in a desired operative position in the reservoir.

In use, the air pump 16 forces air through the air supply conduit 18 via the downcomer 44 into effluent in the lower chamber 26 of the fluid evaporator 14 when operatively positioned at the top surface 20 of the reservoir. Preferably, the fluid evaporator 14 is operatively positioned by floating on the top surface 20 of the reservoir and anchoring the discharge riser 34c to the bottom of the reservoir with the anchors 38. The air is discharged through the sparge ports 32b creating a region of low density fluid confined within annular space 26 and beneath the top surface 20 of effluent 12 in the reservoir, which causes an upwelling of effluent 12 into the annular space 26 forming a two-phase mixture of air and effluent 12 that is thoroughly mixed as the heavy density liquid effluent 12 phase overruns the highly immiscible low density gaseous phase creating turbulence and resultant shearing forces that break the gas phase into small bubbles. Small bubbles created in this process create greatly expanded interfacial surface area between the continuous liquid effluent 12 phase and the discontinuous gas phase and thereby promote rapid heat and mass transfer between the phases including water vapor transfer to the gas phase and transfer of components of the air stream including oxygen to the effluent 12. The air and effluent mixture then rises rapidly upward through the first opening 48 in the first baffle 46 and rises to a level above the top surface 20 of the effluent in the reservoir due to momentum gained by the upwelling of liquid into, and combined turbulent flow of air and effluent 12 mixture through, chamber 26 and into middle chamber 24. Once released from the confines of chamber 26, shear forces between effluent 12 and air are greatly reduced causing rapid separation of effluent 12 and air under the force of gravity. Under the influence of gravity effluent 12 flows radially outward towards the third annular wall 23a and downwards toward the top surface 20 of the effluent in the reservoir. As the aerated effluent spreads horizontally, moist exhaust air escapes upwardly from the top surface of effluent within chamber 26 that has now been elevated above the top surface 20 of effluent 12 within the reservoir and travels through the second openings 52 and along the exhaust pathway A to the exhaust ports 30. As previously described, effluent droplets and contaminants carried by the exhaust air are separated from the exhaust air by the surfaces of the exhaust pathway A and the various baffles 50, 58, 60, and 61 before the exhaust air is discharged through the exhaust ports 30. Simultaneously, as the level of effluent within the middle chamber 42 rises above the operable condition level of effluent 20, gravity forces effluent to flow from the middle chamber 42 downwardly through the discharge pipes 34a, 34b and the discharge riser 34c back into the reservoir. If the system includes one or more of the solar thermal energy collectors 40, the vessel 22 may be heated and/or the air may be heated upstream from the fluid evaporator 14 by the solar thermal energy collectors to improve the rate of evaporation of fluid in the vessel.

Functionally separating the inlets 64 of the discharge pipes 34a, 34b from the annular space where aeration occurs within the weir formed by the first annular wall 26a provides distinct advantages. This arrangement provides a confined space for high turbulence mixing of the air and effluent within the lower chamber 26, thus increasing the surface-to-volume ratio of air-water interface to increase the rate of evaporation. Simultaneously, this arrangement provides increased surface area at the top of the aerated effluent within chamber 26 that has been elevated above the top surface 20 of the effluent 12 in the reservoir for separation of the exhaust air from the effluent as the aerated effluent travels horizontally over the weir and radially outwardly before the aerated effluent is discharged back into the reservoir through the discharge pipes 34a, 34b.

In one preferred exemplary arrangement, the fluid evaporator 14 is fabricated almost entirely from plastics such as high density polyethylene, polyvinyl chloride and other suitable plastic assemblies and tube sections. The upper chamber 24 is approximately five feet (1.5 m) in diameter and the vessel 22 is approximately six feet (1.8 m) tall. Each of the openings 52 through the second baffle 52 is four inches (10 cm) in diameter, each exhaust port 30 is three inches (7.5 cm) in diameter, and each discharge pipe 34a, 34b is six inches (15 cm) in diameter. Of course, the fluid evaporator 14 may have other dimensions and be formed of any materials suitable for functioning in the manner described herein.

Figure 4:
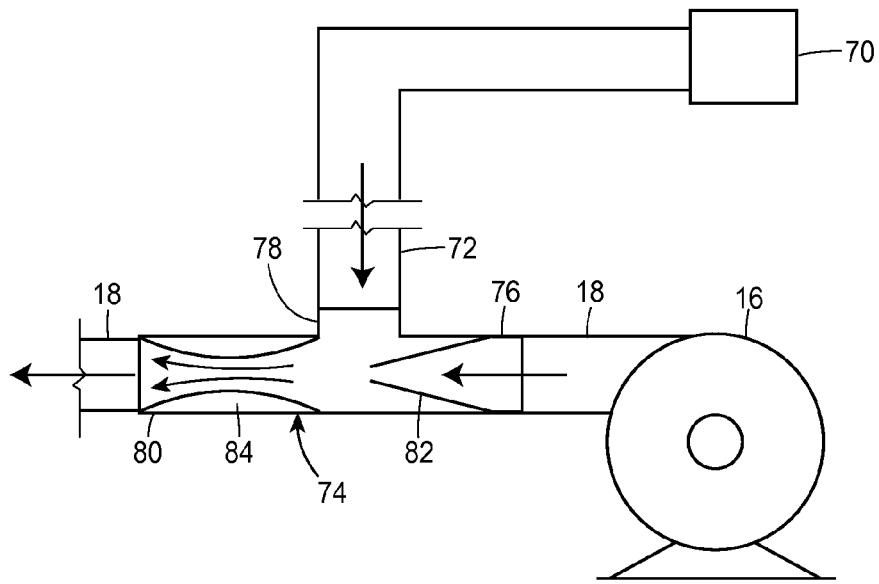
FIG. 4 is a detailed schematic view of a connection between an engine exhaust and a blown air supply line from an air pump in the reservoir evaporation system.

According to another option, the air forced through the air supply conduit 18 is heated with exhaust heat from an internal combustion engine 70, such as a diesel or gas powered engine that either directly drives the air pump 16 or that drives an electrical generator that drives an electric motor that drives the air pump 16. In one contemplated arrangement, the exhaust heat is injected into the air supply conduit 18 immediately downstream of the air pump 16. Preferably, an exhaust duct 72 functionally connects exhaust from the engine 70 to the air supply conduit 18 at a junction fitting 74 adapted to rapidly mix the hot exhaust with the air from the air pump 16 and cool the exhaust to a temperature that will not be harmful to the material of the air supply conduit 18. This is particularly important where the air supply conduit is formed of materials that do not resist high temperatures well, such as PVC or other plastics. A preferred fitting 74 is an eductor as shown in FIG. 4. In this arrangement, the eductor 74 has an inlet section 76 connected directly to or in-line very close to the air pump 16, a T-connection section 78 connected to the exhaust duct 72 and an outlet section 80 connected to the air supply conduit 18 that supplies the fluid evaporator 14. A nozzle 82, such as a frusto-conical section, is disposed inside the inlet section 76. The nozzle 82 has an outlet of reduced diameter in the general vicinity of the T-connection section 78 that increases the velocity and decreases the pressure of the air coming from the air pump 16. The decreased static pressure of the air exiting the nozzle 82 helps draws the exhaust from the exhaust duct 72. Downstream of the T-connection section 78, a venturi 84 formed inside the outlet section 80 further increases the velocity and mixing of the mixture of air and heated exhaust, thereby quickly lowering the temperature of the heated exhaust to a temperature that will not be harmful to the downstream portions of the air supply conduit 18. For example, it is contemplated that heated exhaust from a diesel power unit, which may enter the fitting 74 at a temperature of over 600 degrees Fahrenheit may leave the fitting 74 at a temperatures below the melting temperature of common PVC, or approximately 180 degrees Fahrenheit. Thus, only the exhaust duct 72 and the fitting 74 would need to be made of high temperature resistant material, such as steel, stainless steel, ceramic, etc., while the remaining portions of the reservoir evaporation system 10 are made of lower cost, lower temperature resistant materials, such as PVC. This option is especially valuable at locations where the effluent to be evaporated 12 is held in an open pond located within or close to a natural gas or oil field and well head hydrocarbons can be used as the fuel source for the internal combustion engine. Combining the heated exhaust gases from the engine 70 may provide even more versatility for use of the fluid evaporator 14 in different environments by reducing efficiency variations caused by variations in the surrounding atmosphere, such as increased humidity or decreased temperature. Alternately, hot exhaust gas may also be drawn into the air stream on the suction side of the blower as turbulence within the blower 16 housing causes rapid mixing of the hot exhaust gas and ambient air with the desirable effect of rapidly approaching a suitable equilibrium temperature for the mixed gas stream mixture to flow through the air supply conduit 18.

Figure 5:
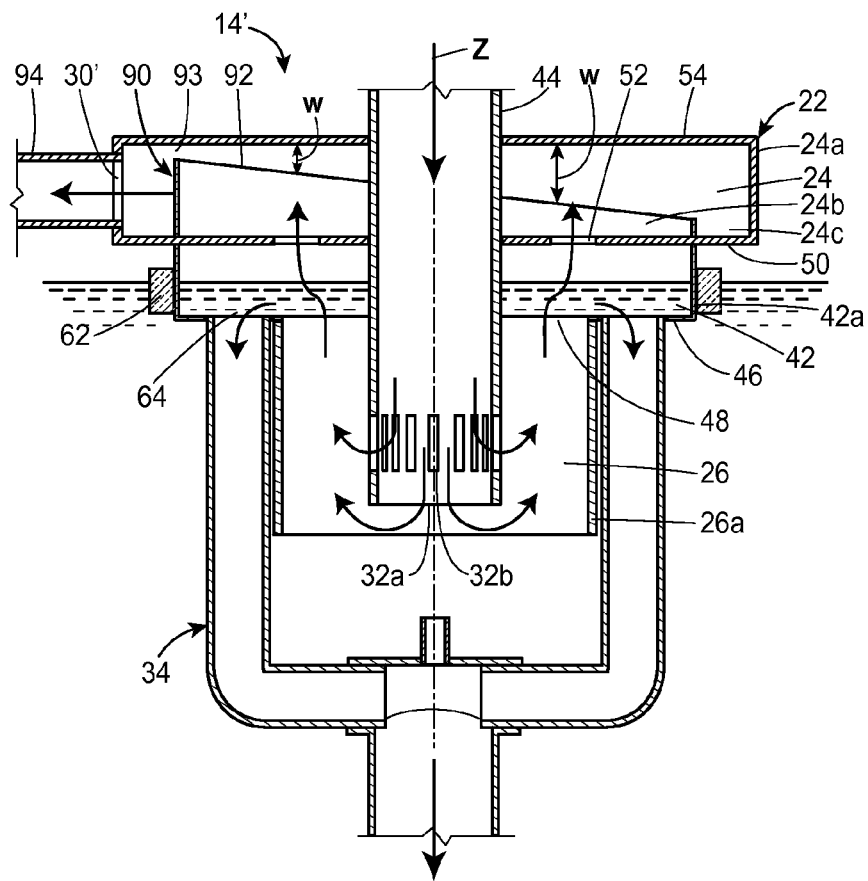
FIG. 5 is a detailed cross-sectional view of another fluid evaporator for use in the reservoir evaporation system.

Turning now to FIG. 5, an alternative design for an evaporator 14' is shown in which the evaporator is adapted for use in a multi-stage system that uses the evaporator 14' as an intermediate in-line unit and the evaporator 14 as a terminal unit in a system including a plurality of evaporators 14 and 14' connected in series. The evaporator 14' is substantially similar to the evaporator 14 with the exception that, in the top chamber 24, the evaporator 14' has a single exhaust port 30' for connection to another transfer conduit and a single bustle 90 rather than the plurality of exhaust ports 30 and the baffles 58 and 60. In this arrangement, the vessel 22, the downcomer 44, and the gas flow paths A are arranged symmetrically about a vertical axis Z, and the exhaust port 30' is non-symmetrically arranged about the vertical axis, such as at a single location on only one side of the top chamber 24. All other portions of the evaporator 14' are preferably the same as the corresponding portions on the evaporator 14 and will not be described again for the sake of brevity. The bustle 90 is operatively disposed between the array of second openings 52 and the exhaust port 30' to provide uniform radial mass flow of air at all circumferential locations around the bustle from a region inside the bustle 90 radially outwardly to a region outside of the bustle 90 to the exhaust port 30'. Thus, the bustle 90 preferably is arranged to allow a non-symmetrically located exhaust port 30' to draw off air from inside the top chamber 24 in a manner designed to maintain symmetrical flow of air upwardly from the sparge ports 32b and through the lower and middle chambers 26 and 42. In the depicted arrangement, the bustle 90 is formed of a circumferential wall 92 extending upwardly from the baffle 50 part way to the top plate 54. The cylindrical wall 92 is spaced radially inwardly from the third annular wall 24a and radially outwardly from the array of second openings 52, thereby forming an inner volume 24b encompassed by the bustle 90 and an outer peripheral volume 24c surrounding the bustle. The circumferential wall 92 preferably defines a gap, such as a slot 93, having a continuously variable width W defined, for example, between the top of the circumferential wall and the top plate 54. In one arrangement, the gap has a smallest width W (i.e., the cylindrical wall is tallest) immediately adjacent the location of the exhaust port 30' and the gap has a largest width W diametrically opposite the location of the exhaust port 30' as shown in FIG. 5. Thus, in one example, the circumferential wall 92 is cylindrical, and the top edge of the circumferential wall 92 defines an inclined plane with its highest point adjacent the exhaust port 30' and its lowest point diametrically opposite from the exhaust port 30'. Preferably, each of the gap between the cylindrical wall 92 and the top plate 54, the downcomer 44, and the exhaust port 30' defines the same cross-sectional flow area. Of course, other bustle designs capable of providing or improving uniform radial mass flow of the air outwardly from the inner volume 24b are also possible, such as those disclosed in U.S. Pat. No. 7,442,035, which is incorporated by reference herein in its entirety. The exhaust port 30' is optionally connected to a conduit 94 that is operatively connected to another instrument, such as another evaporator 14 or 14' as described in more detail hereinafter. The exhaust port 30' may alternatively exhaust to air or be connected to some other device.

Figure 6:
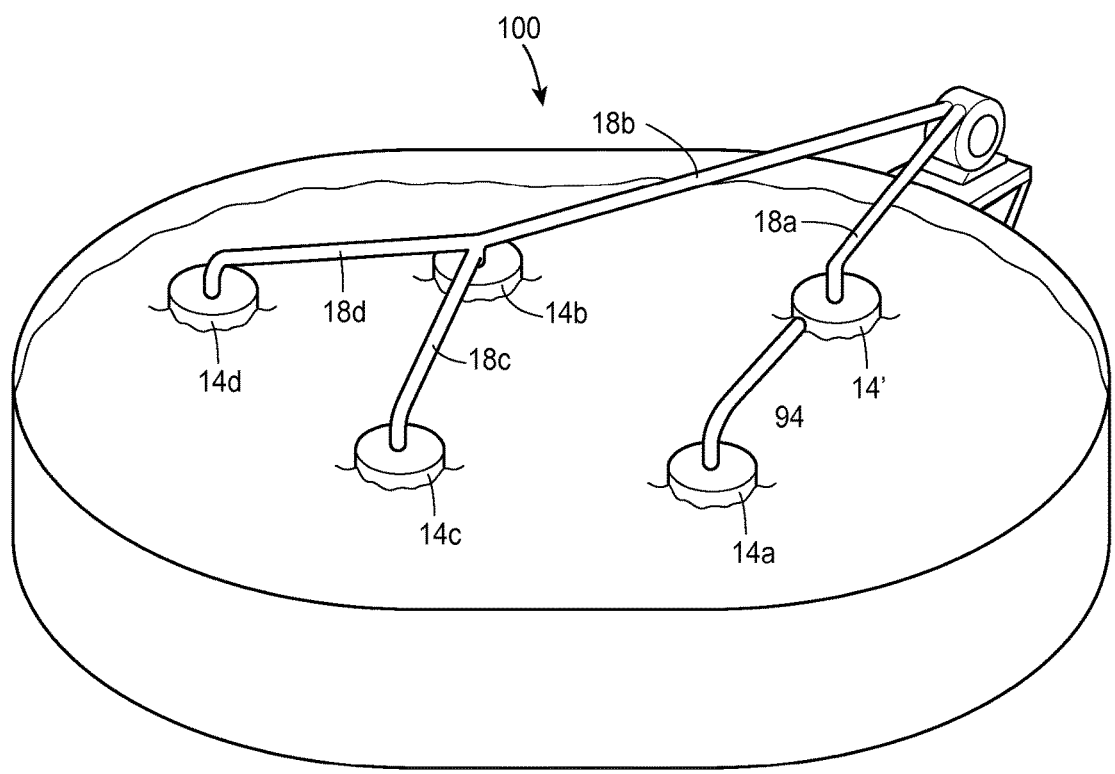
FIG. 6 is a perspective view of a reservoir evaporation system according to another aspect including multiple fluid evaporators connected for simultaneous operation in an open holding tank.

Turning now to FIG. 6, another operative arrangement of a reservoir evaporation system 100 is shown in which a plurality of the fluid evaporators 14a-d and 14' are operatively disposed in a fluid reservoir consisting of an open top holding tank, such as a waste water treatment settlement tank. In this example, each fluid evaporator 14a-d is functionally identical to the fluid evaporator 14. In this arrangement, the air pump 16 is located at the edge of the tank remote to each of the fluid evaporators 14a-d and 14', and each fluid evaporator is functionally connected to the air pump by means of one or more air supply conduits 18 or 94. The fluid evaporators 14a-d and 14' may be connected in series and/or in parallel. For example, the fluid evaporators 14' and 14a are connected in series by the air supply conduits 18a and 94. In this arrangement, the fluid evaporator 14' defines an in-line unit and the evaporator 14a defines a terminal unit, wherein the exhaust gas from the exhaust port 30' of the evaporator 14' is directed into the downcomer 44 of the evaporator 14a to be used as input gas in the evaporator 14a. This arrangement forms a multi-stage evaporation system by using the exhaust from a first evaporator as the input gas into a second evaporator. This arrangement may be extended for any number of interconnected in-line and terminal unit evaporators 14 and 14' in series and in parallel. The fluid evaporators 14' and 14b are connected in parallel by the air supply conduits 18a and 18b, the fluid evaporator 14b is connected in series with each of fluid evaporators 14c and 14d, which are, in turn, connected with each other in parallel. These various arrangements exemplify a significant benefit of the present reservoir evaporation system. The system may be easily adapted and modified to provide maximum evaporation to reservoirs of different shapes and sizes by simply connecting more of the fluid evaporators 14 and/or 14' in various spatial configurations to a single air pump or to multiple air pumps. Thus, the reservoir evaporation systems of the present disclosure provide a large degree of flexibility for adapting to many different locations and needs.

Figure 7:
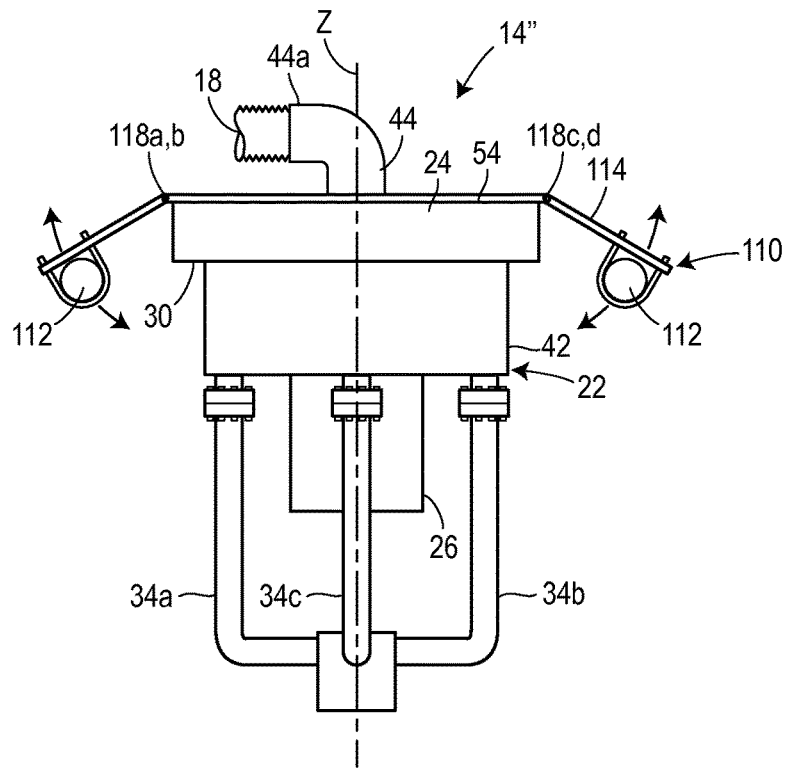
FIG. 7 is a side view of a fluid evaporator showing further optional aspects.
Figure 8:
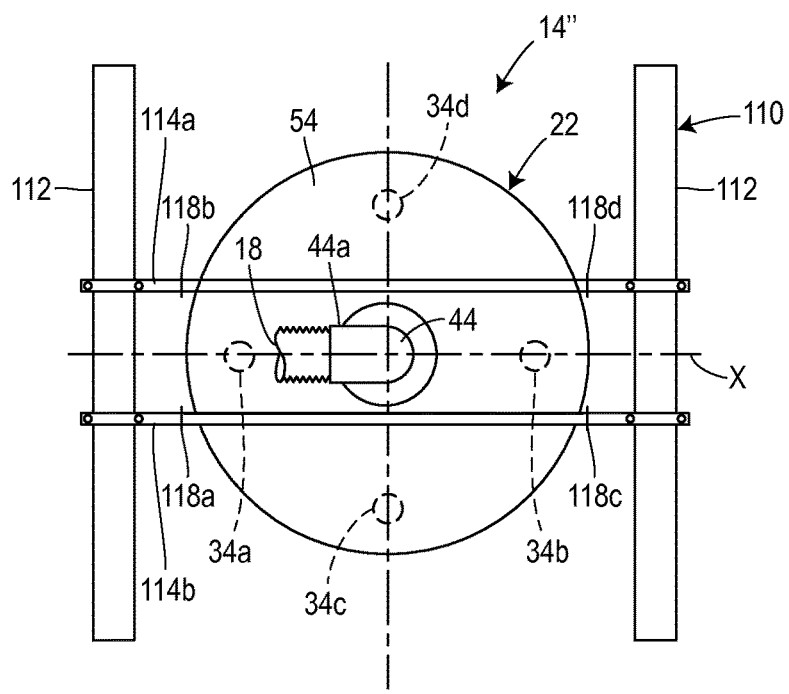
FIG. 8 is a top view of the fluid evaporator of FIG. 7.

Turning now to FIGS. 7 and 8, a further design of a fluid evaporator 14" is substantially similar to the fluid evaporators 14 and/or 14', but with the addition of a stabilization system 110, additional discharge tubes 34c, 34d, and dimensional changes described hereafter. Like the previously described fluid evaporators 14 and 14', the fluid evaporator 14" also includes a partially enclosed vessel 22 having a middle chamber 42 disposed between an upper chamber 24 and a lower chamber 26, an air supply downcomer 44 arranged for connection to an air supply conduit 18 for injecting air into the lower chamber 26, and internal baffles (not shown) arranged to provide a tortuous path from the middle chamber 42 to exhaust outlets through the outer wall or walls of the upper chamber 24. Preferably, each of the upper, middle, and lower chambers 24, 42, 26, has a circular, or annular periphery, and is coaxially aligned along a longitudinal centerline axis Z. Also preferably, the air supply downcomer 44 extends through the top plate 54 downwardly along the longitudinal axis Z and has an open end with sparge ports (not shown) arranged to inject air from the air supply conduit 18 into the lower chamber 26. The arrangement of internal baffles in some arrangements is the same as described with respect to either fluid evaporator 14 or 14' or may have other similar arrangements capable of providing one or more of the same functionalities as described herein. The discharge tubes 34a-d are preferably radially spaced equally from the axis Z and equally spaced angularly along the outer periphery, such as one discharge tube in each quadrant around the axis Z, and preferably spaced at 90° on center around the outer periphery. Further, the outer annular periphery of the lower chamber 26 is spaced radially inwardly from the discharge tubes 34a-d rather than being located immediately adjacent the discharge tubes as shown for the fluid evaporators 14 and 14'. Preferably, remaining features of the partially enclosed vessel 22 in some arrangements are identical to corresponding features in either of the fluid evaporators 14 or 14' and can be understood with reference to the prior descriptions thereof. The fluid evaporator 14" may also be used in the reservoir evaporation system 100 in combination with or alternatively to the fluid evaporators 14 and 14'.

The stabilization system 110 is provided on the fluid evaporator 14" to help stabilize the fluid evaporator 14" in the upright position, i.e., with the axis Z aligned generally vertically, the lower chamber 26 disposed in the water, and the top plate 54 disposed above the water, on the top surface of the water during operation, i.e., while air is being forced through the air supply downcomer 44 into the lower chamber 26. The stabilization system 110 includes one or more floatation devices 112 operatively secured to the vessel 22 by, for example, one or more outriggers 114. Preferably, the position of the floatation devices 112 may be adjusted axially and/or radially to, for example, cause the vessel 22 to sit higher or lower in the water. In the depicted arrangement, the stabilization system 110 includes two flotation devices 112, each having the form of an elongate enclosed hollow tube, such as a 7' long by 6" diameter PVC pipe with enclosed ends, disposed diametrically opposite each other on opposite sides of the vessel 22. Each flotation device 112 is spaced radially from the outer annular periphery of the vessel and sized to provide sufficient buoyancy to hold the upper chamber 24 spaced above the top surface of the water in selected arrangements. In one arrangement, each flotation device 112 has a length that is longer than the diameter of the upper chamber 24, but other size devices may also be adequate. The flotation devices 112 are connected to two outriggers 114, which are shown in the form of two struts 114a and 114b, such as metal tubes, bars, or angle irons, arranged in parallel on opposite sides of the downcomer 44, and connected to the top plate 54 by welds or fasteners, for example. Each strut 114a, 114b extends outwardly from opposite sides of the outer annular periphery of the upper chamber 24, and each flotation device 112 is attached to the struts, for example with fasteners 116 such as bolts or cables near the end of the strut. Each strut 114a, 114b preferably includes a hinge 118a, 118b, 118c, 118d spaced from the outer annular periphery of the upper chamber 24 and arranged to allow the flotation devices 112 to be selectively raised and/or lowered by pivoting the ends of the struts 114a and 114b around the respective hinges. The flotation devices 112 are preferably disposed spaced along an axis X defined by the air supply conduit 18 over the top plate 54 approaching the downcomer 44, such as may defined by a horizontal portion 44a of an elbow connector that connects the air supply conduit 18 to the downcomer 44. Further, each flotation device 112 is preferably axially aligned substantially perpendicular to the axis X in a generally horizontal plane perpendicular to the axis Z. In one arrangement, the axis X is substantially perpendicular to and extends through the axis Z. In this arrangement, the flotation devices 112 may be particularly well arranged to counteract rotational forces that act to tip the vessel 22 off of substantially vertical alignment in response to air being forced through the air supply conduit 118 and into the downcomer 44. Preferably, the ends of the struts 114a, 114b are arranged to be locked in any one of multiple or infinite selected angular orientations by a lock, such as a bolt, pin, and/or clamp, to releasably lock the flotation devices at a selected height along the axis Z. Thus, the height of the flotation devices 112 may be easily adjusted to maintain the fluid evaporator 14" at a desired vertical position at the top surface of the water, such as to maintain the exhaust ports 30 approximately 1"-2" (2.5 cm-5 cm) above the top surface of the water, and thereby compensate, for example, for fluids having different densities and/or other variations, such as changes in weight loads. The stabilization system 110 is not limited to the particular arrangement depicted in the drawings, and may take other forms capable of counteracting tipping forces and/or providing for adjustable depth control, for example with a complete or partial ring-shaped flotation device surrounding the vessel 22 that may be moved up and/or down along the axis Z and radially in and/or out from the outer annular periphery of the upper chamber 24. The stabilization system 110 is not limited to use with only the fluid evaporator 14" and may be used with other fluid evaporators according to the principles of the present disclosure. In some arrangements, the stabilization system 110 is combined with the fluid evaporators 14 and 14' in a manner consistent with the present disclosure.

The fluid evaporators 14, 14', and 14", and the reservoir evaporation systems 10, 100 may be manufactured in any suitable manner apparent to a person of ordinary skill. In preferred arrangements, components of the fluid evaporators are formed of HDPE, PVC and/or metal and connected with fasteners, welds, and/or adhesives, for example. However, the fluid evaporators 14, 14', and 14" are not limited to any particular material or construction technique.

The reservoir evaporation systems 10, 100 and the fluid evaporators 14, 14', and 14" as disclosed herein are particularly advantageous for use in arid climates, wherein the air injected into the fluid evaporator is very dry and more readily evaporates the fluid from the effluent. Further, the fluid evaporator 14 of the present disclosure provide a nearly maintenance-free design because there are no moving parts in the fluid evaporator that may need to be repaired or regularly cleaned and the turbulent flow paths within the chambers provide scouring and cleaning effects when the pond evaporator is operating. The design is further simplified by having all or most of the moving parts confined to the air pump 16 and any power supply drive means for the air pump, which can be easily accessed when located at the side of the reservoir. Because the fluid evaporator 14 is a single-pass system and high turbulence is maintained within the internal passages of the vessel 22, buildup of scale on the various parts and the frequency at which the parts would need to be cleaned is minimized. By eliminating high pressure pneumatic lines and/or high pressure water lines, a minimum of instrumentation is required as compared to systems that utilize high pressure lines.

Fluid evaporators, aerators, and mixers in accordance with any one or more of the principles disclosed herein in some arrangements may be applied to any combination of these unit operations within, for example, ponds or tanks, for purposes such as reducing the volume of water or wastewater through evaporation, humidifying gases and gas mixtures such as air, dissolving air in water to prevent water or wastewater from turning septic, providing air and oxygen to support aquaculture or to reduce chemical oxygen demand, and/or mixing desirable materials with water or wastewater. For example, fluid evaporators and systems of the present disclosure are in some arrangements useful for simple aeration of ponds to prevent anaerobic effects, oxygenation of fish and shell fish farm ponds, aeration and evaporation of livestock wastewater ponds, evaporation of ponds used for oil and gas field waters, aeration of ponds at golf courses, and aeration and/or evaporation of many other types of fluid reservoirs.

We claim:

1. A reservoir evaporation system for evaporating fluid from an open reservoir of effluent containing a fluid and a contaminant, the system comprising:
   a fluid evaporator comprising a vessel with an upper chamber and a lower chamber, the vessel adapted to float in an operative position partially submerged on the top surface of the effluent in the reservoir with the lower chamber submerged in the effluent and the upper chamber extending above a top surface of the effluent, a first opening into a lower portion of the lower chamber to allow the effluent to enter the chamber, and a second opening into the upper chamber disposed to be above the top surface of the effluent and in communication with the lower chamber;
   an air pump; and
   an air supply conduit connecting the fluid evaporator with the air pump, the air supply conduit having an outlet arranged to discharge forced air into the lower portion of the lower chamber;
   wherein when the fluid evaporator is in the operative position, air from the air pump can be injected into the effluent in the lower chamber and subsequently travel through the upper chamber to be discharged from the vessel through an exhaust opening in an outer wall of the upper chamber, the air exiting the exhaust opening downwardly, towards the lower chamber and towards the effluent in the reservoir, whereby fluid from the effluent in the lower chamber can be separated from the contaminant by evaporation.

2. The system of claim 1, the fluid evaporator further comprising a water discharge conduit extending downwardly from the vessel, the water discharge conduit having a first end located in the vessel laterally adjacent the lower chamber and separated by a weir from the lower chamber, the weir located to allow fluid to flow thereover from the lower chamber to the first end, wherein when in the operative position aerated effluent can flow from the lower chamber into the water discharge conduit over the weir, and through the water discharge conduit to a discharge opening in the fluid reservoir below the top surface of the contaminated fluid, whereby aerated effluent from the lower chamber can be discharged into the reservoir below the top surface.

3. The system of claim 1, wherein a flotation device is secured to the vessel and arranged to cause the vessel to float in the operative position.

4. The system of claim 1, wherein the air pump comprises a fan.

5. The system of claim 1, wherein the air pump is remote from the fluid evaporator.

6. The system of claim 5, wherein the air supply conduit comprises a tube connected to the air pump and the fluid evaporator, wherein the tube is made of a plastic material, and further comprising an internal combustion engine arranged to power the air pump, wherein heated exhaust gases from the internal combustion engine are combined with air from the air pump at a junction fitting adapted to rapidly mix the heated exhaust gases with the air from the air pump and cool the exhaust gases to a temperature that will not be harmful to the plastic material of the tube.

7. The system of claim 5, further comprising a second fluid evaporator identical to the first fluid evaporator, the second fluid evaporator being connected with the air pump by a second air supply conduit.

8. The system of claim 7, wherein the first fluid evaporator and the second fluid evaporator are connected in series with the air pump.

9. The system of claim 7, wherein the first fluid evaporator and the second fluid evaporator are connected in parallel with the air pump.

10. The system of claim 1, further comprising a solar energy collector adapted to heat the vessel and/or a solar thermal energy collector arranged to heat air in the air supply conduit upstream from the fluid evaporator.

11. The system of claim 1, further comprising a second fluid evaporator connected in series with the first fluid evaporator by a second conduit, wherein exhaust gas from the first fluid evaporator is used as input gas into the second fluid evaporator.

12. The system of claim 1, further comprising:
an electric motor arranged to drive the air pump;
electrical generator arranged to power the electric motor, and
an engine arranged to drive the electrical generator,
wherein waste heat from exhaust from the engine is mixed into the forced air supplied to the fluid evaporator.

13. The system of claim 1, wherein the upper chamber and the lower chamber are stacked sequentially and are coaxially aligned with the air supply conduit.

14. The system of claim 13, wherein the upper chamber is wider than the lower chamber.

15. The system of claim 14, wherein the upper chamber and the lower chamber are cylindrical in shape.

16. A method of evaporating fluid from an open reservoir of fluid having a top surface, the method comprising the steps:
floating a fluid evaporator at the top surface of the fluid in a partially submerged state, the fluid evaporator comprising a vessel with an upper chamber and a lower chamber, a bottom end of the vessel submerged in the fluid with the lower chamber submerged in the fluid, and a top end of the vessel disposed above the top surface of the fluid with the upper chamber extending above the top surface of the fluid, a first opening into a lower portion of the lower chamber to allow the fluid to enter the lower chamber, and a second opening into the upper chamber disposed above the top surface of the fluid and in communication with the lower chamber;
forcing air into the fluid in the lower portion of the lower chamber through an outlet of an air supply conduit, the outlet disposed below the top surface of the fluid;
aerating the fluid with the air inside the lower portion of the vessel; and
discharging the air after aerating through the upper chamber to an exhaust opening in an outer wall of the upper chamber, the air exiting the exhaust opening downwardly, towards the lower chamber and towards the effluent in the reservoir, whereby fluid in the lower chamber is evaporated in the discharged air.

17. The method of claim 16, further comprising the step of simultaneously discharging aerated fluid from the fluid evaporator through a fluid discharge conduit downwardly into the reservoir.

18. The method of claim 17, further comprising the step of anchoring the fluid evaporator to the bottom of the reservoir with the fluid discharge conduit.

19. The method of claim 16, further comprising the step of heating the vessel with a solar energy collector.

20. The method of claim 16, further comprising the step of heating the air upstream of the fluid evaporator.

21. The method of claim 20, wherein the step of heating includes adding exhaust heat from an internal combustion engine to the air.

22. The method of claim 16, wherein an air pump is located remote from the fluid evaporator, and the air is forced through the air supply conduit from the blower.

23. The method of claim 22, further comprising the steps of:
floating a second said fluid evaporator on the top surface of the fluid in a partially submerged state; and
forcing air with the air pump through a second air supply conduit into effluent in the lower portion of the vessel of the second fluid evaporator.

* * * * *